United States Patent
Davidson

(10) Patent No.: US 10,707,747 B2
(45) Date of Patent: *Jul. 7, 2020

(54) SINGLE STAGE ISOLATED AC/DC POWER FACTOR CORRECTED CONVERTER

(71) Applicant: Christopher Donovan Davidson, West Vancouver (CA)

(72) Inventor: Christopher Donovan Davidson, West Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/567,951

(22) Filed: Sep. 11, 2019

(65) Prior Publication Data
US 2020/0177073 A1    Jun. 4, 2020

Related U.S. Application Data

(60) Continuation-in-part of application No. 16/289,295, filed on Feb. 28, 2019, now Pat. No. 10,454,367.
(Continued)

(51) Int. Cl.
*H02M 1/42* (2007.01)
*H02M 3/335* (2006.01)
(Continued)

(52) U.S. Cl.
CPC ..... *H02M 1/4241* (2013.01); *H02M 3/33569* (2013.01); *H02M 1/44* (2013.01);
(Continued)

(58) Field of Classification Search
CPC ...... H02M 1/42; H02M 1/4208; H02M 1/425; H02M 1/4258; H02M 2001/0058
See application file for complete search history.

(56) References Cited

U.S. PATENT DOCUMENTS

| 3,938,024 A | 2/1976 | Clarke |
| 4,559,590 A | 12/1985 | Davidson |

(Continued)

FOREIGN PATENT DOCUMENTS

EP    2393195    12/2011

OTHER PUBLICATIONS

M. Scherbaum et al., "An Isolated, Bridgeless, Quasi-resonant ZVS-Switching, Buck-Boost Single-Stage AC-DC Converter with Power Factor Correction (PFC)", 2017 IEEE Applied Power Electronics Conference and Exposition (APEC); Mar. 26-30, 2017; pp. 74-81; Tampa, FL, USA.

(Continued)

*Primary Examiner* — Fred E Finch, III
*Assistant Examiner* — Rafael O. De León Domenech
(74) *Attorney, Agent, or Firm* — Smiths IP

(57) ABSTRACT

Two versions of an isolated single stage converter AC/DC Power Factor Corrected (PFC) converter topology have been invented. One is with a full bridge rectifier at its input and the other is a True Bridgeless version. The two versions of the topology feature new configurations and circuitry including a simplified damper circuit and a clamp capacitor flipping circuit and control methods that allow them to realize improved single stage isolated power factor converters which are suitable for high power operation, features Zero Voltage Switching to maximize conversion efficiency and to minimize ElectroMagnetic Interference generation, does not need an additional circuit to limit the inrush current, achieves reasonably low input current Total Harmonic Distortion (THD), and is easy to control. The second version provides a true bridgeless single stage isolated power factor converter with even higher efficiency and lower input current THD.

2 Claims, 23 Drawing Sheets

Related U.S. Application Data which is a division of application No. 15/214,250, filed on Jul. 19, 2016, now Pat. No. 10,263,508.

(60) Provisional application No. 62/195,094, filed on Jul. 21, 2015.

(51) Int. Cl.
  *H02M 1/00* (2006.01)
  *H02M 1/44* (2007.01)

(52) U.S. Cl.
  CPC .............. *H02M 2001/0009* (2013.01); *H02M 2001/0058* (2013.01)

(56) References Cited

U.S. PATENT DOCUMENTS

| | | | |
|---|---|---|---|
| 6,272,027 | B1 | 8/2001 | Fraidlin et al. |
| 6,674,658 | B2 | 1/2004 | Mao et al. |
| 6,822,882 | B1 | 11/2004 | Jacobs et al. |
| 7,778,046 | B1 | 8/2010 | Cuk et al. |
| 10,263,508 | B2 | 4/2019 | Davidson |
| 10,454,367 | B2 * | 10/2019 | Davidson ............ H02M 1/4241 |
| 2010/0259240 | A1 | 10/2010 | Cuk |
| 2010/0265231 | A1 | 10/2010 | Jang |
| 2012/0287688 | A1 * | 11/2012 | Fornage ............... H03K 17/693 363/123 |
| 2013/0063185 | A1 | 3/2013 | Ye et al. |
| 2013/0063982 | A1 | 3/2013 | Ye et al. |
| 2013/0063985 | A1 | 3/2013 | Ye et al. |
| 2013/0242622 | A1 | 9/2013 | Peng et al. |
| 2015/0131337 | A1 | 5/2015 | Gabrielsson et al. |
| 2016/0218626 | A1 | 7/2016 | Del Carmen, Jr. |
| 2017/0279367 | A1 | 9/2017 | Qiu et al. |
| 2019/0199202 | A1 | 6/2019 | Davidson |

OTHER PUBLICATIONS

H. Umeda et al., "High Power 3-phase to 3-phase Matrix Converter Using Dual-gate GaN Bidirectional Switches", 2018 IEEE Applied Power Electronics Conference and Exposition (APEC); Mar. 4-8, 2018; pp. 894-897; San Antonio, TX, USA.
C. D. Davidson, "Zero Voltage Switching Isolated Boost Converter Topology", 2011 IEEE 33rd International Telecommunications Energy Conference (INTELEC); Oct. 9-13, 2011; Amsterdam, Netherlands.
C. D. Davidson, "Virtual Prototyping Using Discrete Time Simulation", APEC 2015 Industry Presentation; Mar. 2015; Charlotte, NC, USA.
Q. Zhang et al., "A New Digital Controller for a Single Stage Bi-flyback PFC Converter", 2010 IEEE 32nd International Telecommunications Energy Conference (INTELEC); Jun. 6-109, 2010; Orlando, FL, USA.
K. Rezaei et al., "A New Control Scheme for an AC-DC Single-Stage Buck-Boost PFC Converter with Improved Output Ripple Reduction and Transient Response", 2014 IEEE Applied Power Electronics Conference and Exposition—APEC 2014; Mar. 16-20, 2014; pp. 1866-1873; Fort Worth, TX, USA.
Bruce Carsten, "Converter Component Load Factors: A Performance Limitation of Various Topologies", PCI Proceedings, Jun. 1988, pp. 31-49; Munich, Germany.
Bruce Carsten, "High Power SMPS Require Intrinsic Reliability", PCI Proceedings, Sep. 1981, pp. 118-133; Munich, Germany.
C. D. Davidson, "Zero Voltage Switching Asymmetrical Half-Bridge Converter Topology", INTELEC 2008—2008 IEEE 30th International Telecommunications Energy Conference; Sep. 14-18, 2008; San Diego, CA, USA.
Dr. Slobodan Cuk, "True Bridgeless PFC Converter Achieves Over 98% Efficiency, 0.999 Power Factor", Power Electronics Technology, Jul. 2010, pp. 10-18.
Dr. Slobodan Cuk, "Single-Stage Bridgeless Isolated PFC Converter Achieves 98% Efficiency", Power Electronics Technology, Oct. 2010, pp. 22-31.
S. Nigsch et al., "Analysis, Modeling and Design of a True Bridgeless Single Stage PFC with Galvanic Isolation", 2015 IEEE Applied Power Electronics Conference and Exposition (APEC); Mar. 15-19, 2015; Charlotte, NC, USA.
Md. Muntasir Ui Alam et al., "A Soft-Switching Bridgeless AC-DC Power Factor Correction Converter for Off-Road and Neighborhood Electric Vehicle Battery Charging", 2014 IEEE Applied Power Electronics Conference and Exposition—APEC 2014; Mar. 16-20, 2014; pp. 103-108; Fort Worth, TX, USA.
Dipl.-Ing (FH) Markus Scherbaum et al., "Implementation of a digital control for Cuk power factor correction (PFC)", Intelec 2013: 35th International Telecommunications Energy Conference, Smart Power and Efficiency; Oct. 13-17, 2013; p. 680-685; Hamburg, Germany.
Slobodan Cuk, "Single-Stage, AC-DC Converter Topologies of 98% Efficient Single Phase and Three-Phase Rectifiers", PCIM Europe 2011; May 17-19, 2011; pp. 17-25; Nuremberg, Germany.
Dr. Slobodan Cuk, "Bridgeless PFC Converter Achieves 98% Efficiency, 0.999 Power Factor", Power Electronics Technology, Aug. 2010, pp. 34-40.
M. Kim et al., "A Fully Soft-Switched Single Switch Isolated DC-DC Converter", 2014 IEEE Applied Power Electronics Conference and Exposition—APEC 2014; Mar. 16-20, 2014; pp. 1106-1111; Fort Worth, TX, USA.
H. Choi, "Two-Switch BCM Flyback Single-Stage PFC for HB LED Lighting Applications", 2013 Twenty-Eighth Annual IEEE Applied Power Electronics Conference and Exposition (APEC); Mar. 17-21, 2013; pp. 3125-3130; Long Beach, CA, USA.

* cited by examiner

SINGLE STAGE ISOLATED AC/DC POWER FACTOR CORRECTED CONVERTER

CROSS-REFERENCE TO RELATED APPLICATIONS

This application claims the benefit of U.S. Provisional Patent Application No. 62/195,094 filed Jul. 21, 2015 and the subject matter thereof is incorporated herein by reference. This application is a continuation-in-part of U.S. patent application Ser. No. 16/289,295, which is a divisional application of U.S. patent application Ser. No. 15/214,250.

FIELD OF THE INVENTION

The present invention relates generally to isolated power factor corrected AC-DC converters and more particularly to single stage AC-DC converters and Bridgeless AC-DC converters.

BACKGROUND OF THE INVENTION

AC/DC Power Factor Corrected (PFC) converters are usually realized by using a full bridge rectifier followed by a boost converter to control the input current waveform to be sinusoidal and in phase with the input voltage waveform and then by an isolated DC/DC converter to provide galvanic isolation and output voltage regulation. This approach has been shown to be effective and efficient in both low power and higher power applications but involves several conversion stages which increases the cost. Also the boost converter stage does not have output current limiting necessitating an additional circuit to limit the inrush current.

Many authors have proposed single stage PFC isolated converters using Flyback or SEPIC topologies such as Q. Zhang in "A New Digital Controller for a Single Stage Bi-flyback PFC Converter", INTELEC 2010, Orlando Fla., June 2010 and H. Choi in "Two Switch BCM Single-Stage PFC for HB LED Lighting Applications", APEC 2013, Long Beach, Calif., March 2013 and K. Reanzi et al. in "A New Control Scheme for an AC/DC Single-Stage Buck-Boost Converter with Improved Output Ripple Reduction and Transient Response" APEC 2014, Fort Worth Tex., March 2014 and D. S. L. Simonetti et al. in "Design Criteria for SEPIC and Cuk converters as Power Factor Pre-regulators in Discontinuous Conduction Mode". These single stage PFC isolated converters are suitable only for lower output powers and need additional circuit modifications to achieve reasonably low input current Total Harmonic Distortion (THD). To allow efficient operation at higher output power and to realize low input current THD it would be best if a boost derived topology was used due to lower component load factor as suggested by Bruce Carsten in "Converter Component Load Factors: A Performance Limitation of Various Topologies", PCI '88, Munich W. Germany, December 88. Also it would be best if the topology used features Zero Voltage Switching (ZVS) to allow high frequency operation, to maximize conversion efficiency and to minimize Electromagnetic Interference (EMI) generation.

One known isolated boost topology that could be used to realize single stage isolated PFC is the Clarke Converter as disclosed by Patrick William Clarke in U.S. Pat. No. 3,938,024, Feb. 10, 1976. This topology is the integration of the boost converter with a 50% push pull converter and operates by having the conduction time of the two primary switches overlapping. However overload and short circuit current limiting is difficult to achieve and a second winding in the inductor is required to absorb the input inductor energy should both switching devices be turned off at the same time, which impresses extra voltage on the switching devices.

Another isolated boost converter topology, previously invented by the author and known as the Davidson Converter, is described in U.S. Pat. No. 4,559,590. This converter is realized by adding a simple 2 winding transformer T with primary and secondary DC blocking capacitors Cp and Cs, a small valued resonant inductor Lr and a diode D2 to the basic non-isolated boost regulator circuit as shown in FIG. 3.

The transformer T provides galvanic isolation and voltage conversion depending upon its turns' ratio Ns/Np and the diode D2 provides a path to recharge the DC blocking capacitors when the primary switch S1 is conducting. A resonant inductance Lr, which can be located in series with the primary or secondary or be the transformer leakage inductance, conducts and limits the discharge current through S1 and D2 when S1 is on. The resonant frequency of Lr and the series combination of Cp and Cs can be selected to be higher or lower than the switching frequency of the converter so that the resonant half cycle of current is discontinuous during the time that S1 is on or is continuous.

An aspect of the presence of the resonant inductor Lr is that it limits the energy that can be transferred from the primary to the secondary when the duty cycle of switch S is low so that current limiting and short circuit protection can be provided by this converter.

One problem introduced by the resonant inductor Lr when it is connected effectively in series with the current path when S1 is off (and by the transformer leakage inductance) is that the voltage across switch S1 will have a large overvoltage due to the inductor L driving current into these smaller inductances. Accordingly an active clamp, as invented by Bruce Carsten for the forward converter is described in "High Power SMPS Require Intrinsic Reliability", PCI '81 proceedings, September 1981, Munich, Germany, consisting of auxiliary switch S2 and clamp capacitor Cclamp was included to clamp the turn off voltage of the main switch S1 as shown in FIG. 4 of this application. The clamp circuit also introduces an additional benefit in that with suitable values of Lr and L, ZVS of both the main switch S1 and the clamp switch S2 can be achieved for all loads and controlled dI/dT turn off of the output rectifying diodes is realized. A clamp circuit really is an essential part of the topology as the energy lost without it is considerable and the active clamp which returns stored energy to converter directly is the best type of clamp to use.

An alternate version of the clamp circuit, the half bridge clamp, can be derived by reversing the positions of S2 and Cclamp and then sliding blocking capacitor Cp through to the other side of the winding then connecting Cclamp to the other side of the blocking capacitor in a similar fashion to that described elsewhere in the patent. Alternate versions of the secondary rectification circuit, such as that shown in FIG. 5 which uses a ½ bridge of capacitors Cs1 and Cs2 rather than the single capacitor Cs can also be used. This version works in the same fashion as the previous rectification circuit in that its output voltage is equal to the peak to peak voltage of the input waveform from the transformer secondary.

Another version of the output circuit that was not described in the original patent is the full wave bridge version. A blocking capacitor is still needed to allow operation over varying duty cycles. In fact any output rectification configuration can be used, as long as the output voltage generated is equal to or a multiple of the peak to peak voltage of the secondary winding, without changing the fundamental nature of the converter topology.

One unique and very interesting property of this topology is that it can be used to create outputs of either polarity without changing the phasing of the secondary winding(s) or create two outputs of either polarity with one secondary winding. The polarity of the output diodes is simply reversed. Similarly the converter can accept either polarity of input voltage and create one polarity of output voltage if the polarity of the primary side switches is reversed. These unique properties hold only if the resonant inductance is in series with the primary and/or secondary windings (or is the transformer leakage inductance) and are not in series with one of the output diodes. These properties allow the converter topology to potentially accept both polarities of input voltage.

Other authors have explored using the Davidson Converter for Isolated PFC Converters although they did not properly refer to it as such. Slobodan Cuk in "Single-Stage Bridgeless Isolated PFC Converter Achieves 98% Efficiency", Power Electronics Technology, October 2010 proposed using a version of the Davidson Converter without an active clamp circuit. Accordingly this converter suffers from high losses as the energy stored in the resonant inductance is not recovered. Muntasir Alam et al. in "A Single-Stage Bridgeless High Efficiency ZVS Hybrid-Resonant Off-Road and Neighborhood EV Battery Charger" APEC 2014 proposes using a totem pole version of the Davidson Converter with an active clamp. This version is not a true bridgeless PFC converter. S. Nigsch et al. in "Analysis, Modelling and Design of a True Bridgeless Single Stage PFC with Galvanic Isolation", APEC2015, Charlotte N.C., March 2015 proposes using an inferior and complicated clamp circuit with two MOSFETs with series connected diodes which is difficult to control and does not allow Zero Voltage Switching.

It is accordingly an object of the invention is to provide an improved single stage isolated power factor converter which is suitable for high power operation, features Zero Voltage Switching to maximize conversion efficiency and to minimize electromagnetic interference (EMI) generation, does not need an additional circuit to limit the inrush current, achieves reasonably low input current THD, and is easy to control. It is a further object of the invention to provide a true bridgeless single stage isolated power factor converter with even higher efficiency and lower input current THD.

These and other objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

In one of its aspects the invention consists of a single stage isolated Power Factor Corrected (PFC) converter with an input full bridge rectifier whose inputs are connected to an AC input source, a first terminal of the input Power Factor (PF) inductor is connected to the first output terminal of the bridge rectifier, a power transformer with primary and secondary windings, the primary of which is in series with a small valued resonant inductor and the series combination of which is connected between the second terminal of the PF inductor and the first terminal of a input DC blocking capacitor, the second terminal of the input DC blocking capacitor is connected to the second output terminal of the input bridge rectifier, a damper circuit consisting of a series connection of a resistor and high frequency blocking inductor is connected between the first terminal of the input DC blocking capacitor and the first output terminal of the bridge rectifier, a main switch consisting of a controlled semiconductor switch and anti-parallel diode is connected to the second terminal of the PF inductor and the second terminal of the input bridge rectifier, an active clamp circuit consisting of a series connection of a clamp capacitor and a second controlled semiconductor switch with an anti-parallel diode, poled opposite to the main switch is connected in parallel with the main switch, the secondary winding of the power transformer is connected in series with an output DC blocking capacitor, the first end of the series combination of which is connected to the center tap of a series connection of output rectifying diodes the first end of which is connected to the first end of a parallel connection of a output capacitor and the load, the second end of the parallel connection of output capacitor and the load is connected to the second end of the series connection of output rectifying diodes and the second end of the series combination of the secondary winding of the power transformer and output DC blocking capacitor.

A second aspect of the invention consists of a single stage isolated Power Factor Corrected (PFC) converter without an input bridge rectifier whose first terminal of the input PF inductor connected is connected to the first terminal of the AC input source, a power transformer with primary and secondary windings, the primary of which is connected in series with a small valued resonant inductor the series combination of which is connected between the second terminal of the PFC inductor and a first terminal of a input DC blocking capacitor, the other end of which is connected to the second terminal of AC input source, a damper circuit consisting of a series connection of a resistor and a high frequency blocking inductor is also connected between the first terminal of the blocking capacitor and the first terminal of the AC input source, main switches consisting of two controlled semiconductor switches and anti-parallel diodes connected in series back to back is connected between the second terminal of the PF inductor and the second terminal of the AC input source, an active clamp circuit consisting of a series connection of clamp capacitor and a second set of two controlled semiconductor switches and anti-parallel diodes connected in series back to back is connected in parallel with the main switches, the secondary winding of the power transformer is connected in series with an output DC blocking capacitor, the first end of the series combination is connected to the center tap of a series connection of output rectifying diodes the first end of which is connected to the second end of the series combination of secondary winding and output DC blocking capacitor, the second end of which is connected to the first end of a parallel connection of output capacitor and the load, the second end of the parallel connection of output capacitor and the load is connected to the first end of the series connection of output rectifying diodes and the second end of the series combination of the secondary winding of the power transformer and output DC blocking capacitor.

In the second aspect of the invention one of or each of the pairs of semiconductor switches could be a single bidirectional four state switch device, such as Gallium Nitride (GaN) High Electron Mobility Transistors (HEMT) transistors. Using these transistors would reduce the number of power switching devices required as a single bidirectional GaN HEMT would replace two back to back unidirectional devices such as silicon or silicon carbide MOSFET devices and will reduce the heat dissipation by a factor of two for the same on resistance of individual devices. This will further increase the converter efficiency.

In both aspects of the invention the semiconductor switches could be silicon or silicon carbide MOSFETs with integral anti-parallel diodes or could be MOSFETs or other controllable semiconductor switching devices with separate diodes connected in anti-parallel. Also in the case of the active clamp MOSFET with separate diodes connected in anti-parallel a diode could be also connected in series with the MOSFET to prevent its integral anti-parallel diode from conducting. The resonant inductor Lr could be located in series with the secondary winding instead of the primary winding or could consist of the leakage inductance of the transformer or a combination of the transformer leakage inductance and the discrete resonant inductance.

An addition to the second aspect of the invention is a flipping circuit consisting of a series combination of a bidirectional switch and an inductor connected in parallel with the clamp capacitor to flip the polarity of the voltage on clamp capacitor at the zero voltage crossing time of the AC input. The bi-directional switch can be realized with back to back MOSFETs, or back to back IGBTs with anti-parallel diodes or by anti-parallel SCRs with diodes connected in series or by a Triac. This circuit relieves the rest of the primary circuitry form the burden of flipping the polarity of the voltage on clamp capacitor thus improving the efficiency of the converter. The converter still has to flip the voltage across the output DC blocking capacitor after the zero cross time but it turns out it can do this quite easily without an additional circuit.

In another embodiment of the both above described aspects of the invention both ends of the series combination of secondary winding and DC blocking capacitor are instead each connected to the center tap of a series connection of output rectifying diodes, the first ends of which are connected to a parallel connection of a output capacitor and the load, the second end of the parallel connection of output capacitor and the load is connected to the second ends of the series connections of output rectifying diodes and the second end of the series combination of the transformer secondary winding and output DC blocking capacitor.

In another embodiment of both above described aspects of the invention, a bipolar output is derived by using two sets of series DC blocking capacitors and series connected diode rectifiers. The first terminal of each DC blocking capacitor is connected to the first end of the transformer secondary winding, the second terminal of the DC blocking capacitors are each connected to the center tap of a series connection of output rectifying diodes, the first ends of which are connected to a parallel connection of one of the output capacitors and one of the loads, the second end of the first parallel connection of output capacitor and load is connected to the second end of the first series connections of output rectifying diodes and the second end of the transformer secondary winding and the first end of the second output capacitor and the second load and the first end of the second set of series rectifier diodes, the second end of the second set of parallel connection of output capacitor and load is connected to the second end of the second series connected rectifier diodes.

In another embodiment of both above described aspects of the invention, two separate outputs are derived from the converter by using two secondary windings each with a series connected DC blocking capacitor, both ends of the each series combination of secondary winding and DC blocking capacitor are each connected to the center tap of a series connection of output rectifying diodes, the first ends of which are connected to a parallel connection of a output capacitor and the load, the second end of the parallel connection of output capacitor and the load is connected to the second ends of their respective series connections of output rectifying diodes and their respective second end of series combination of the transformer secondary winding and output DC blocking capacitor.

Another aspect of the invention is a circuit which implements a method to control the converter primary circuitry. The circuitry can use a standard PFC control IC such as the UC3854B IC as long as an additional comparator circuit is added to its output to derive the complementary drive waveforms of both the main switches and the clamp switch with the necessary dead times. Average current mode control of the boost inductor current can be achieved in the same way as in the traditional non-isolated PFC boost converter to control the input current wave shape to be proportional to the input voltage resulting in unity power factor. A secondary control circuit can use traditional Op Amp error amplifiers to sense the output voltage and provide a control signal to the PFC control IC directly or via an optical coupler. The control bandwidth should be kept low so as not to distort the input current wave shape.

Another aspect of the second aspect of the invention is additional logic circuitry that implements an extra method in addition to the method needed for the control circuitry of the first aspect of the invention. A scaling amplifier detects the input voltage and comparators detect the zero cross time and polarity of the input voltage. A multiplier flips the input current sensing for the PFC control IC when the input voltage is negative.

A logic circuit turns off the MOSFET drives during the time the clamp capacitor voltage is being flipped and determines which MOSFET is continuously on and which is being Pulse Width Modulated according to the detected polarity of the input voltage. A flip flop circuit, triggered at zero cross and reset at zero current in the flipping inductor and switch provides the drive signal for the clamp capacitor flipping switches.

Digital control circuitry using DSP or FPGA devices can be used instead of the herein described analog circuitry to implement the control methods described above for the aspects of the invention.

The foregoing may cover only some of the aspects of the invention. Other aspects of the invention may be appreciated by reference to the following description of at least one preferred mode for carrying out the invention in terms of one or more examples. The following mode(s) for carrying out the invention is not a definition of the invention itself, but is only an example that embodies the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF THE PREFERRED AND OTHER ASPECTS AND EMBODIMENTS OF THE INVENTION

Figure 6:
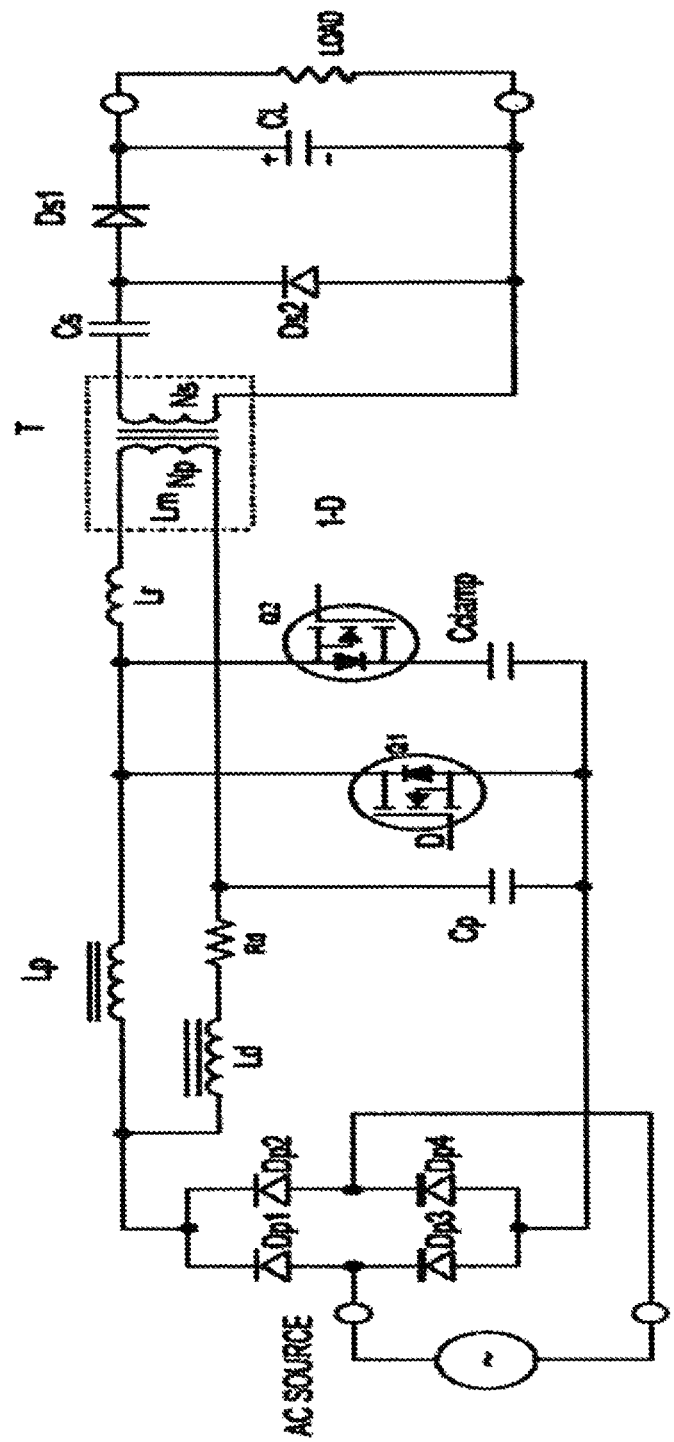
FIG. 6 is a circuit diagram of the first aspect of the invention with a half bridge output rectifier.
Figure 6A:
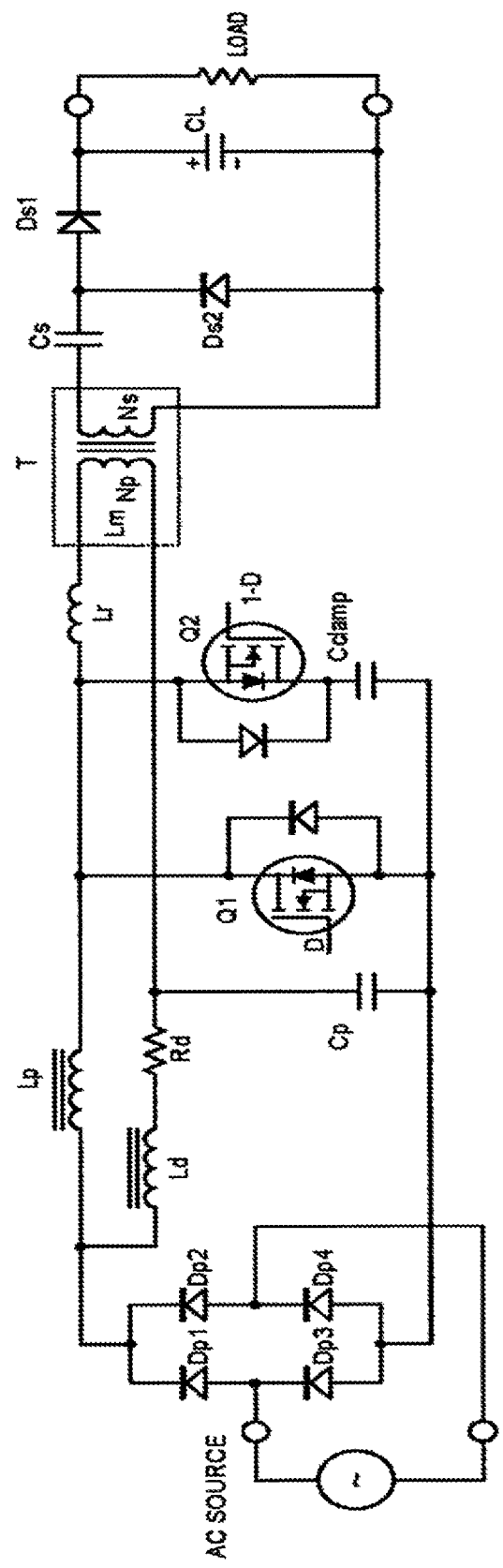
FIG. 6A is a circuit diagram of the circuit shown in FIG. 6 but including separate diodes placed anti-parallel to the MOSFETs.
Figure 6B:
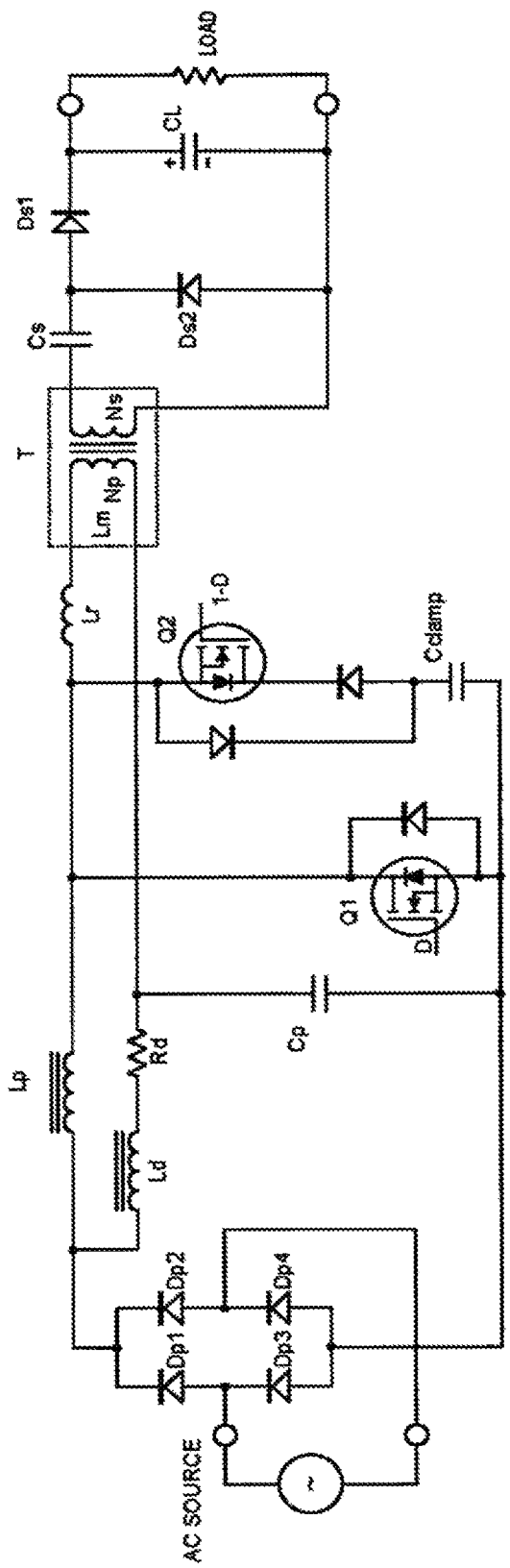
FIG. 6B is a circuit diagram of the circuit shown in FIG. 6 but including separate diodes placed anti-parallel to the MOSFETs and a diode also connected in series with the active clamp MOSFET.

The basic schematic of one aspect of the invention is shown in FIG. 6. The converter is connected to an AC source by its input terminals. Four diodes Dp1, Dp2, Dp3, and Dp4 form a full bridge rectifier to rectify the AC source voltage to create a unipolar rectified sine wave voltage. A Power Factor Correction (PFC) inductor Lp is connected to one output of the bridge rectifier. A power transformer T has magnetization inductance Lm, primary winding Np and secondary winding Ns. Its primary winding is connected in series with a small valued resonant inductor Lr and they are then connected to the PFC inductor and a DC blocking capacitor Cp. A damper circuit consisting of a series connection of a resistor Rd and high frequency blocking inductor Ld is connected between the first the blocking capacitor Cp and the first output terminal of the full bridge rectifier. The damper circuit dampens the resonance of the transformer magnetizing inductance with the effective series capacitance of the input and output DC blocking capacitors, while its high frequency blocking inductor minimizes the switching frequency current through the damper resistor. The damper could instead be connected across Cp but an extra DC blocking capacitor with a value greater than that of Cp would be needed to be connected in series with the damper to block the DC voltage of Cp so connecting the damper as shown in the diagram is much preferred.

A main switch consisting of a controlled semiconductor switch Q1 with an anti-parallel diode is connected to the second terminal of the PFC inductor. If the semiconductor switch is a MOSFET then its integral drain-source diode can function as the anti-parallel diode. An active clamp circuit consisting of a series connection of clamp capacitor Cclamp and a second controlled semiconductor switch Q2 with an anti-parallel diode is connected in parallel with the main switch. The polarity of the second switch Q2 is opposite to that of the first switch Q1. The switch Q1 and the clamp capacitor can be in either order and if the clamp capacitor is connected to the power factor inductor then Q2 can be realized by a P channel MOSFET to enable a low side drive circuit. However for high voltage applications P channel MOSFETs are hard to come by so Q2 will most likely be realized with an N channel MOSFET and a floating drive signal will be needed regardless. The main and clamp switches are driven to be on or off by complementary drive waveforms D and 1-D respectively, which are developed by a suitable control circuit.

With the relative position of the clamp capacitor and clamp switch being as in FIG. 6 the clamp capacitor can instead be connected to the other end of series blocking capacitor without changing the operation of the circuit significantly as the voltage across the DC blocking capacitor has only a small amount of voltage ripple.

The secondary winding of the power transformer is connected in series with an output DC blocking capacitor Cs. A center tap of a series connection of output rectifying diodes Ds1 and Ds2 rectifies the transformer secondary waveform and creates a DC voltage equal to the peak-peak voltage of the transformer secondary winding across the output capacitor CL which is in parallel with the output terminals. An output load, which is powered by the converter, is typically connected to the output terminals of the converter.

Figure 1:
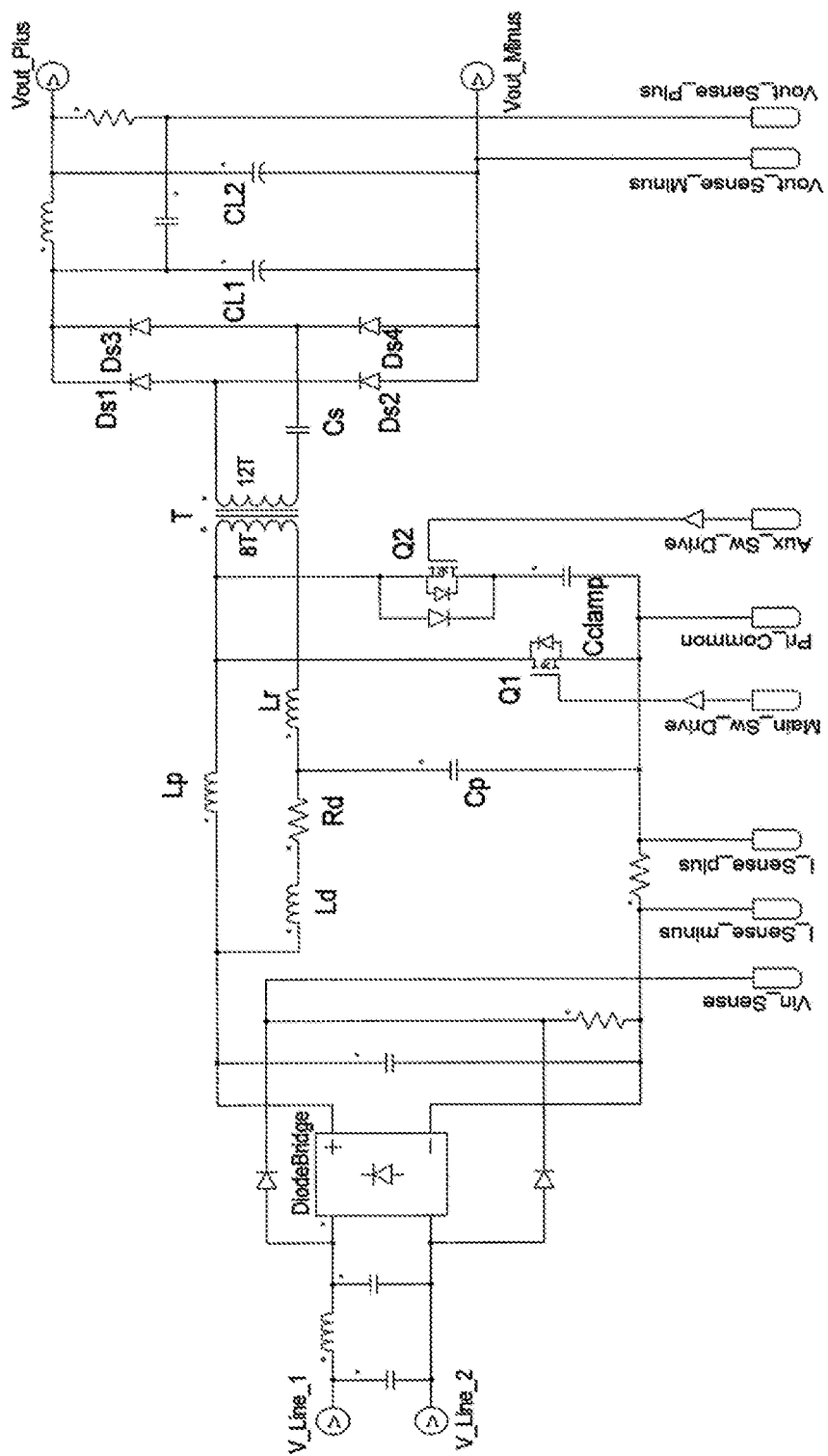
FIG. 1 is a circuit diagram of a practical realization of the first aspect of the invention with a full bridge input rectifier including an EMI filter and output filter and input and output voltage sensing and input current sensing components.

FIG. 1 represents a practical full embodiment embodying the principles and features of the first aspect of the invention described above.

Figure 7:
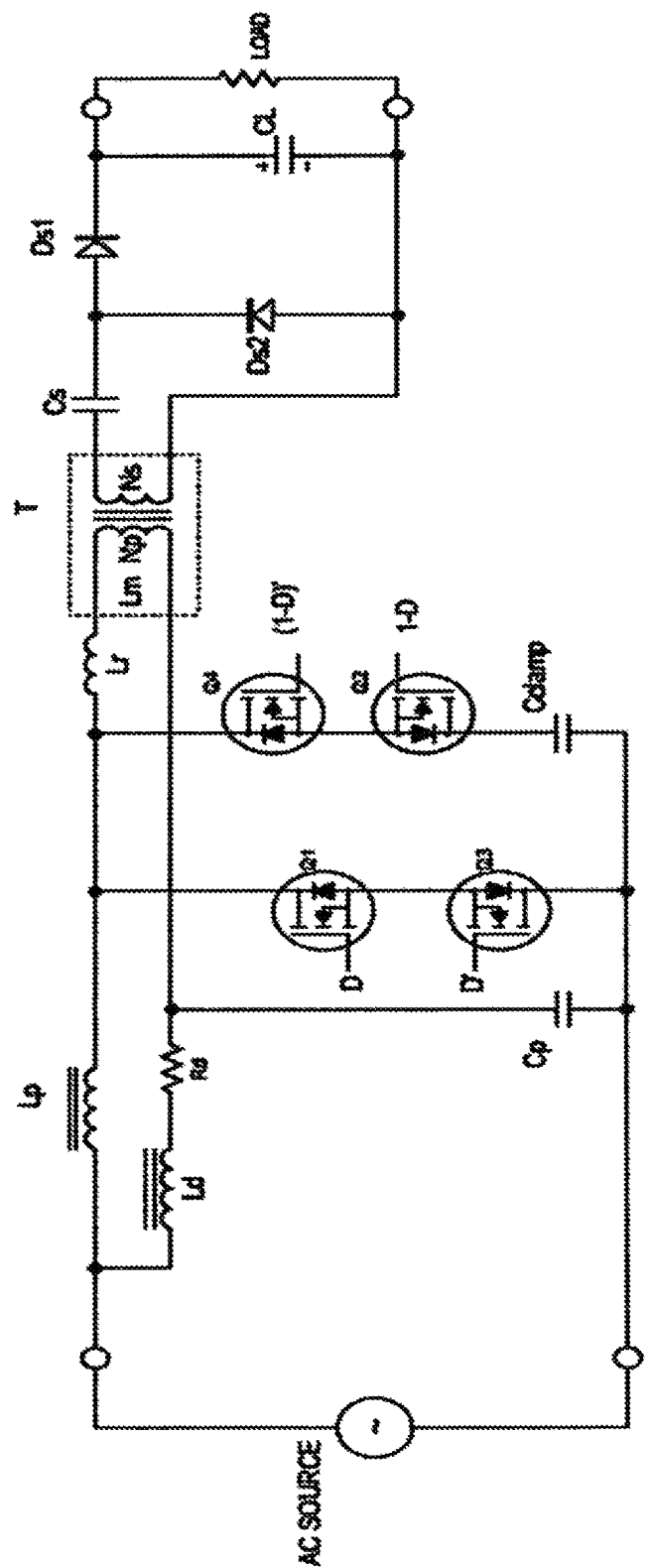
FIG. 7 is a circuit diagram of the second aspect of the invention, having no input rectifier with a half bridge secondary rectifier circuit.

A schematic of a second aspect of the invention is shown in FIG. 7. The converter is connected to an AC source at its input terminals. A PFC inductor Lp is connected to one input terminal of the converter. A power transformer T has magnetization inductance Lm, primary winding Np and secondary winding Ns. Its primary winding is connected in series with a small valued resonant inductor Lr and they are then connected to the PFC inductor and a DC blocking capacitor Cp. A damper circuit consisting of a series connection of a resistor Rd and high frequency blocking inductor Ld is connected between the first the blocking capacitor Cp and the first input terminal of the converter. Again the damper could instead be connected across Cp but an extra blocking capacitor with a value greater than that of Cp would be needed to be connected in series with the damper to block the DC voltage of Cp so connecting the damper as shown in the diagram is much preferred.

A main switch consisting of two back to back series connected controlled semiconductor switches Q1 and Q3 with anti-parallel diodes are connected to the second terminal of the PFC inductor. If the semiconductor switches are MOSFETs then their integral drain-source diode can function as the anti-parallel diodes. An active clamp circuit consisting of a series connection of a clamp capacitor Cclamp and two controlled semiconductor switches Q2 and Q4 with anti-parallel diodes are connected in parallel with the main switch. The clamp capacitor and back-back active clamp switches can be in either order. Common source connection of both sets of back-back switches will reduce the complexity of the needed floating gate drive circuits. The main switch Q1 and clamp switch Q2 are driven to be on or off by complementary drive waveforms D and 1-D respectively during the positive half cycle of the AC line voltage while the main switch Q3 and clamp switch Q4 are driven to be continuously on. The main switch Q3 and clamp switch Q4 are driven to be on or off by complementary drive waveforms D' and (1-D)' respectively during the negative half cycle of the AC line voltage while the main switch Q1 and clamp switch Q2 are driven to be continuously on.

The secondary circuitry shown for this version converter is identical to the first aspect of the invention so will not be described again.

Figure 7A:
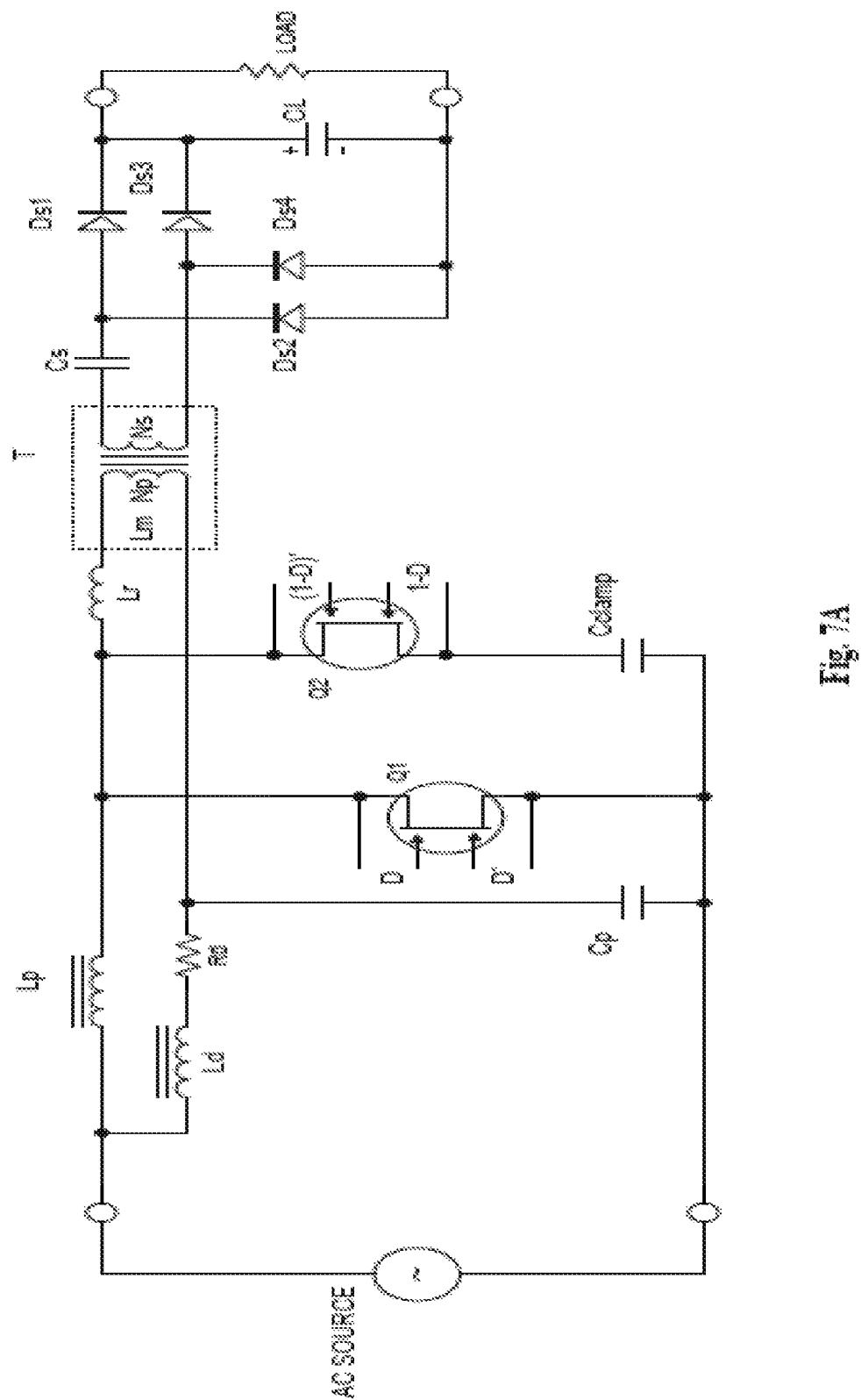
FIG. 7A is a circuit diagram of the second aspect of the invention, with two bidirectional four state GaN HEMT switching devices, one for the main switch and the other for the active clamp switch.

A schematic of a second aspect of the invention with bidirectional four state GaN switches is shown in FIG. 7A. The converter is connected to an AC source at its input terminals. A PFC inductor Lp is connected to one input terminal of the converter. A power transformer T has magnetization inductance Lm, primary winding Np and secondary winding Ns. Its primary winding is connected in series with a small valued resonant inductor Lr and they are then connected to the PFC inductor and a DC blocking capacitor Cp. A damper circuit consisting of a series connection of a resistor Rd and high frequency blocking inductor Ld is connected between the first the blocking capacitor Cp and the first input terminal of the converter. Again the damper could instead be connected across Cp but an extra blocking capacitor with a value greater than that of Cp would be needed to be connected in series with the damper to block the DC voltage of Cp so connecting the damper as shown in the diagram is preferred.

A main switch consisting of a single bidirectional four state GaN NEMT controlled semiconductor switches Q1 is connected to the second terminal of the PFC inductor. An active clamp circuit consisting of a series connection of a clamp capacitor Cclamp and a single bidirectional four state GaN HEMT controlled semiconductor switch Q2 are connected in parallel with the main switch. The clamp capacitor and switches can be in either order. Separate source connection for the needed floating gate drive circuits is needed necessitating two isolated driver supplies per switch.

Figure 8:
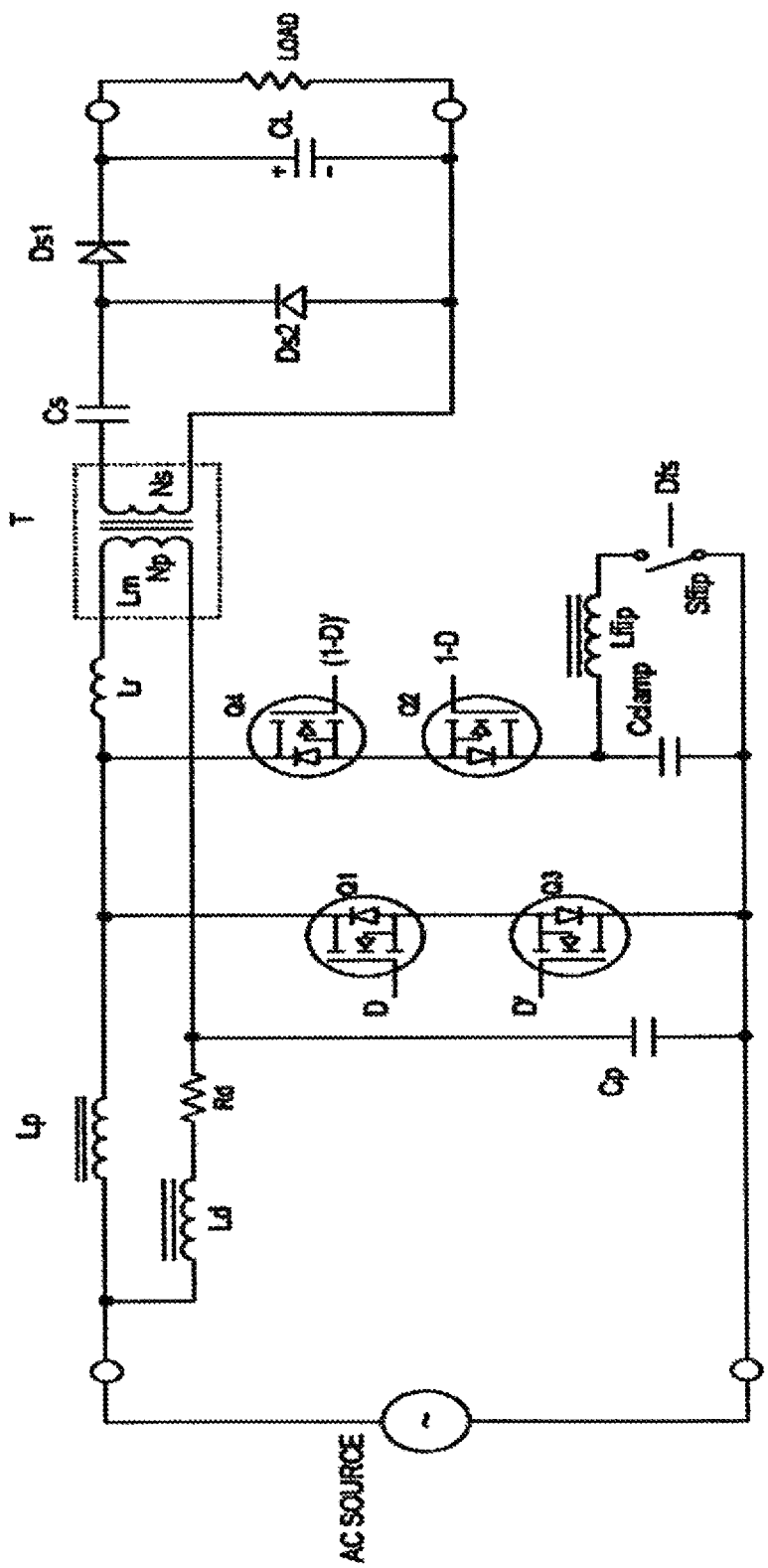
FIG. 8 is a circuit diagram of the second aspect of the invention with the polarity flipping circuit.

The schematic of a second embodiment of this aspect of the invention is shown in FIG. 8. This embodiment is identical to the previous version except with the addition of a flipping circuit consisting of a series combination of a bidirectional switch Sflip and an inductor Lflip connected across the clamp capacitor to flip the polarity of the voltage on the clamp capacitor at the zero voltage crossing time of the AC input. As the switching frequency of the flipping switch is only two times that of the input AC line frequency, the bi-directional switch can be realized with back to back MOSFETs, or back to back IGBTs with co-packaged or discrete anti-parallel diodes or by anti-parallel SCRs with or without series diodes or by a Triac. The flipping switch is driven to be on or off for a short period at the zero voltage crossing time by a signal Dfs developed by the control circuit. This circuit relieves the rest of the primary circuitry from the burden of flipping the polarity of the voltage on the clamp capacitor thus improving the performance of the converter. The voltage of the input DC blocking capacitor varies naturally to be the same as the input AC voltage and there is no need to flip the voltage of this capacitor. The converter still has to flip the voltage across the secondary DC blocking capacitor after the zero cross time, and a similar circuit could be employed to do so, but it turns out the converter can do this quite easily without an additional circuit.

Figure 8A:
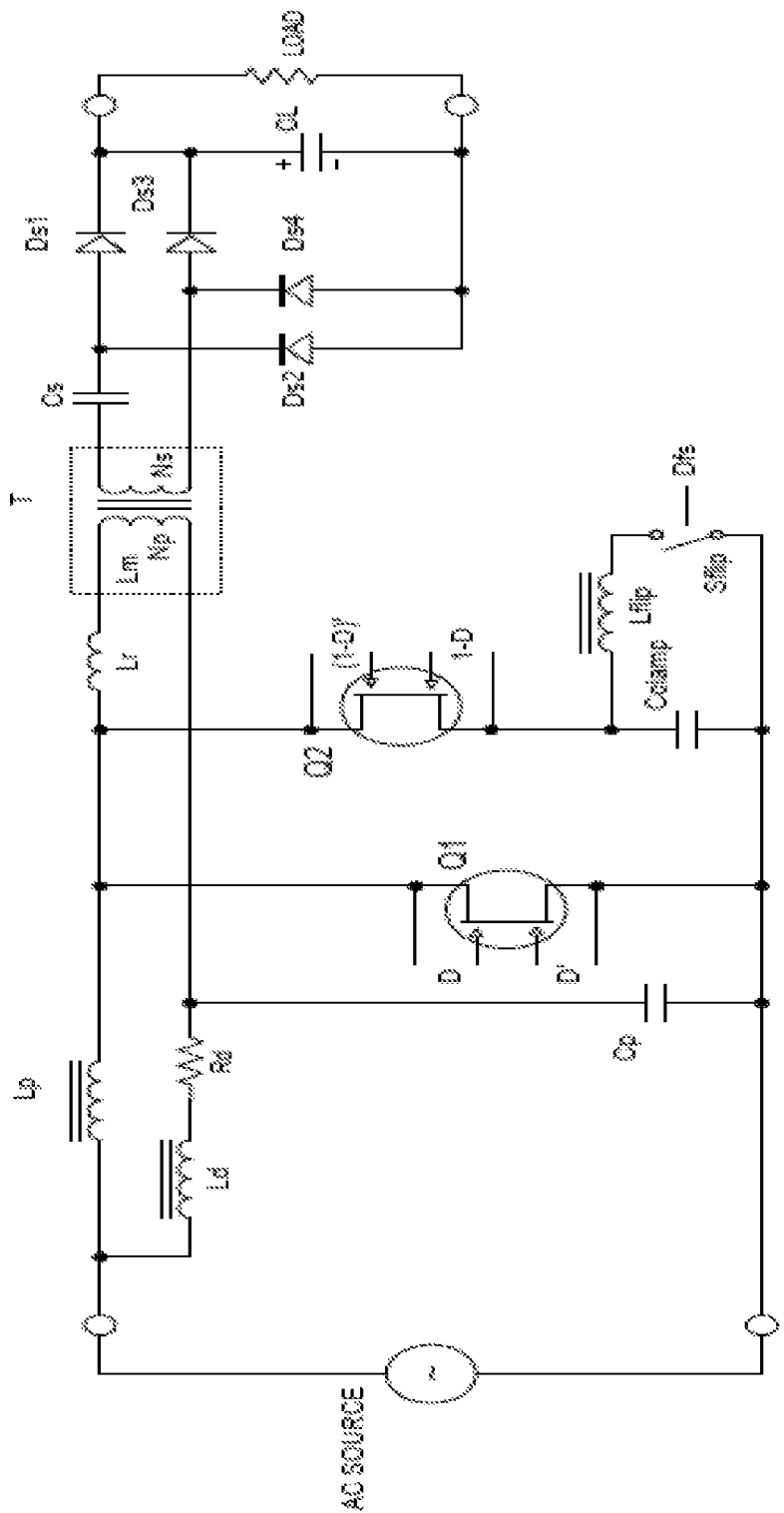
FIG. 8A is a circuit diagram of the second aspect of the invention with two bidirectional four state GaN HEMT switching devices and the polarity flipping circuit.

The schematic of an additional embodiment of this aspect of the invention is shown in FIG. 8A. This embodiment includes a flipping circuit consisting of a series combination of a bidirectional switch Sflip and an inductor Lflip connected across the clamp capacitor to flip the polarity of the voltage on the clamp capacitor at the zero voltage crossing time of the AC input. As the switching frequency of the flip switch is only two times that of the input AC line frequency, the bi-directional switch can be realized with back to back MOSFETs, or back to back IGBTs with co-packaged or discrete anti-parallel diodes or by anti-parallel SCRs with series diodes or by a Triac or it could be realized by using a single bidirectional four state GaN NEMT controlled semiconductor switch. This circuit relieves the rest of the primary circuitry from the burden of flipping the polarity of the voltage on the clamp capacitor thus improving the performance of the converter. The voltage of the input DC blocking capacitor varies naturally to be the same as the input AC voltage and there is no need to flip the voltage of this capacitor. The converter still has to flip the voltage across the secondary DC blocking capacitor after the zero cross time but it turns out it can do this quite easily without an additional circuit.

Figure 2:
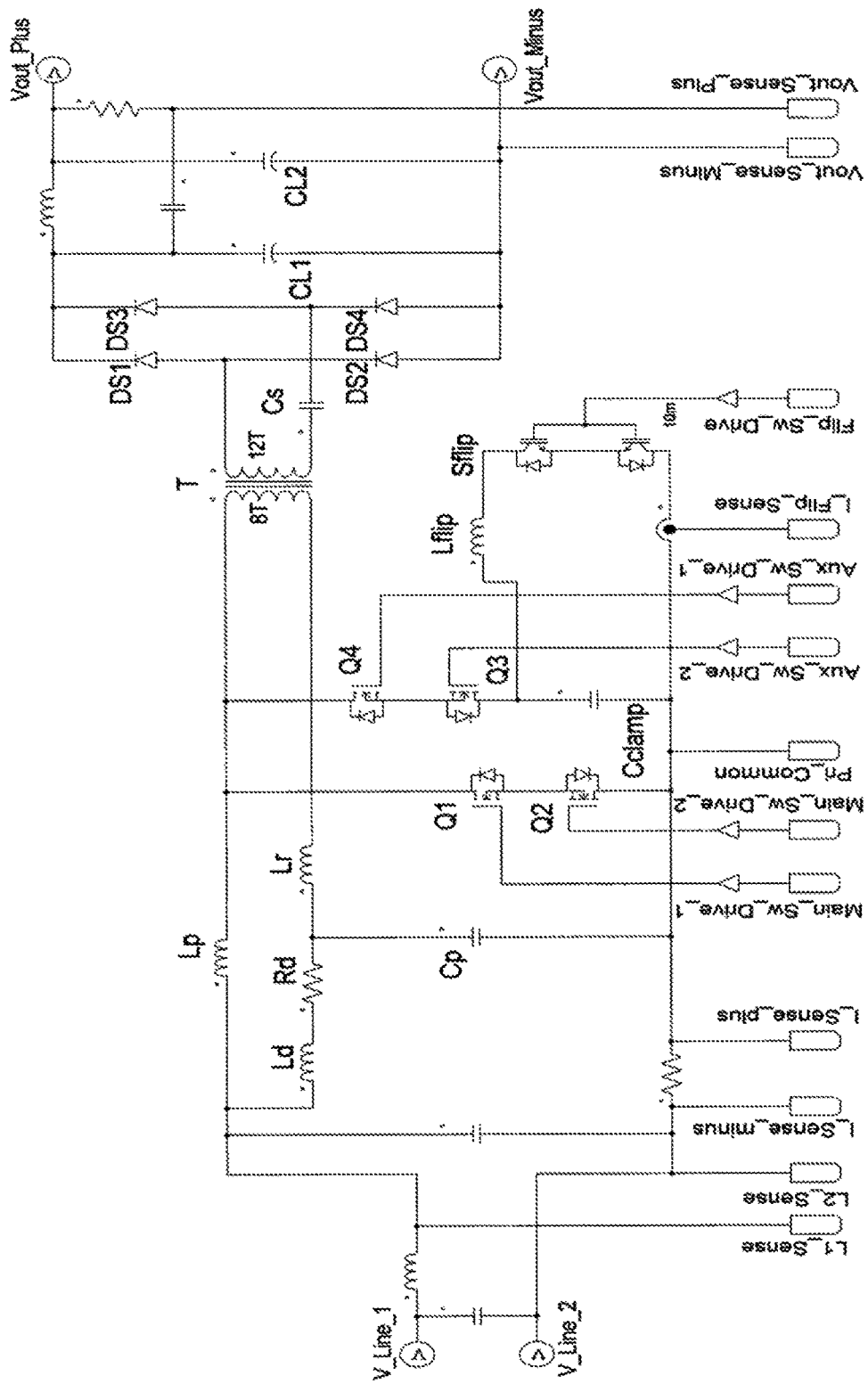
FIG. 2 is a circuit diagram of a practical realization of the second aspect of the invention having no input bridge rectifier and including the polarity flipping circuit, an EMI filter and output filter and input and output voltage sensing and input current sensing components.
Figure 3:
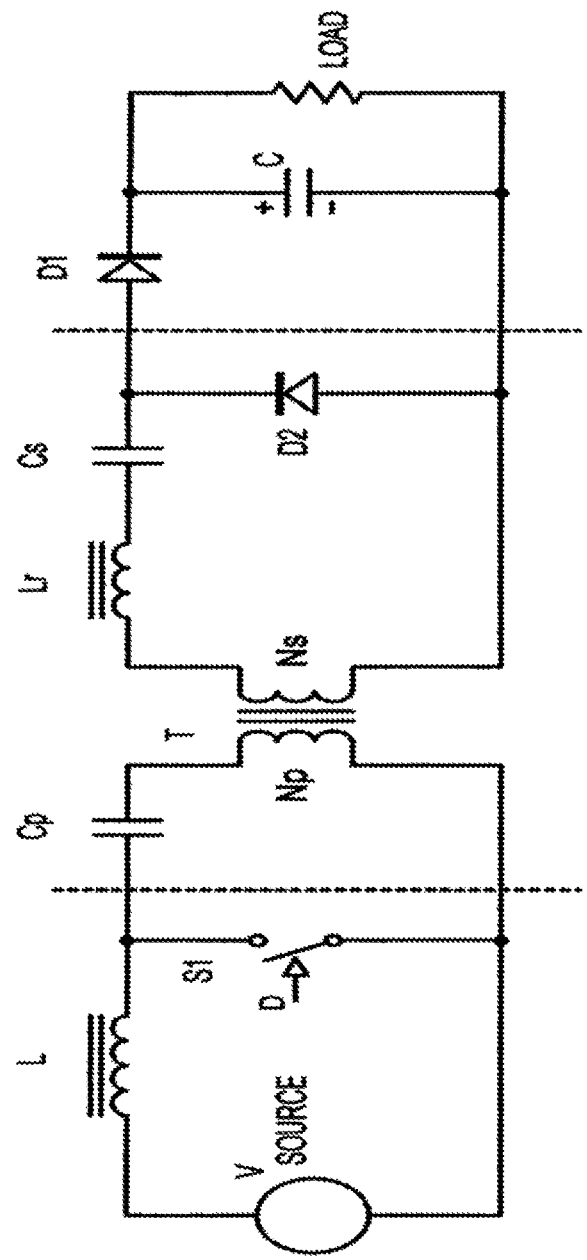
FIG. 3 is a circuit diagram of the prior art Davidson converter.
Figure 4:
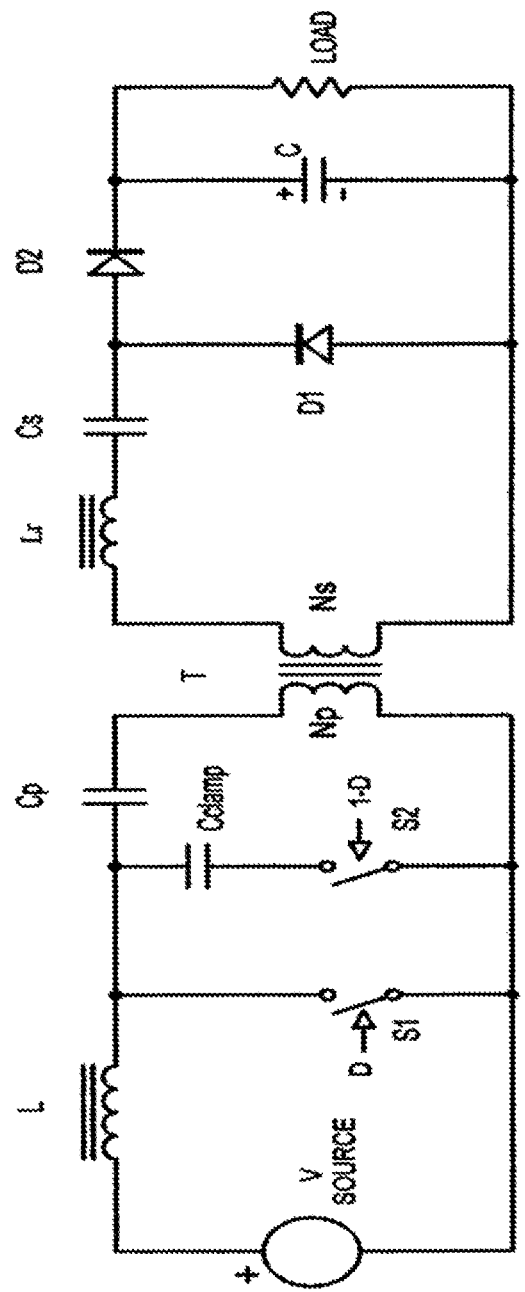
FIG. 4 is a circuit diagram of the prior art Davidson converter with an active clamp circuit.
Figure 5:
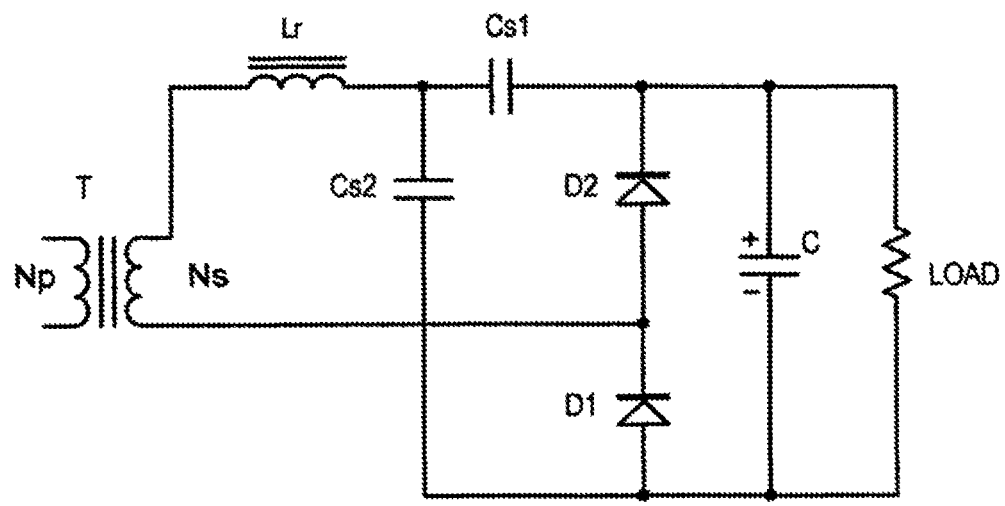
FIG. 5 is a circuit diagram of the half bridge capacitor secondary circuit of the prior art Davidson converter.

FIG. 2 represents a practical full embodiment of the second aspect of the invention.

Figure 9:
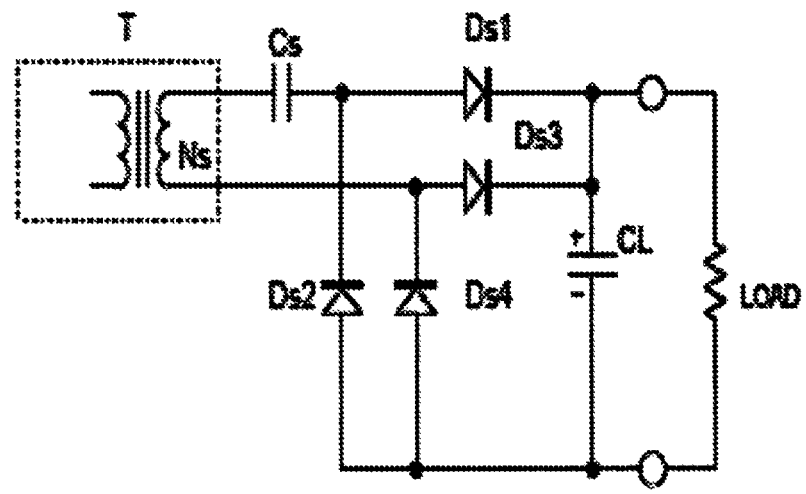
FIG. 9 is a circuit diagram of the alternate full bridge secondary rectifier circuit.

The schematic of an alternate secondary circuit with full bridge rectification for both above described aspects of the invention is shown in FIG. 9. The secondary winding of the power transformer is connected in series with an output DC blocking capacitor Cs. A full bridge of output rectifying diodes Ds1, Ds2, DS3 and Ds4 rectifies the transformer secondary waveform and creates a DC voltage equal to the peak-peak voltage of the transformer secondary winding across the output capacitor CL which is in parallel with the output terminals. This embodiment has the advantage of lower ripple current in the output capacitor but requires more diodes.

Figure 10:
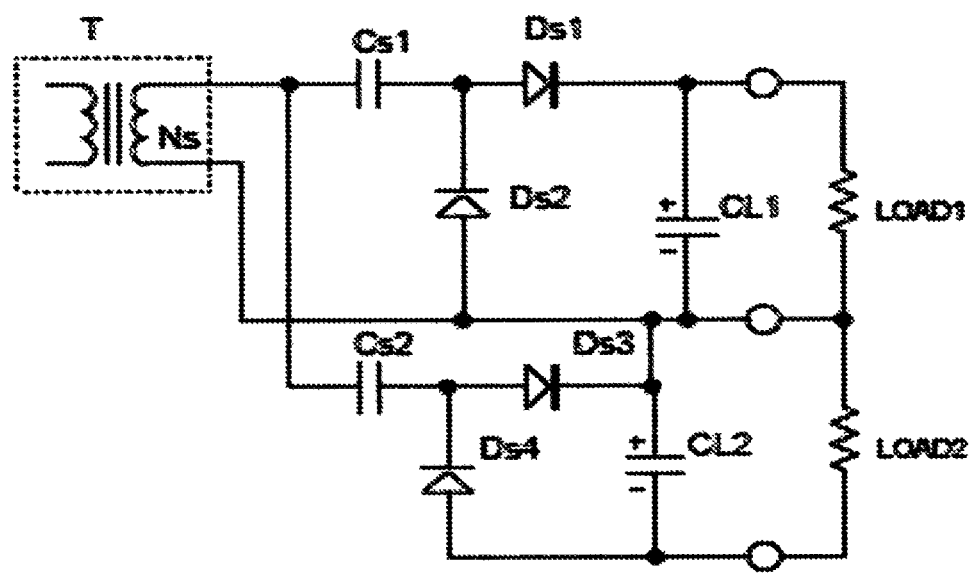
FIG. 10 is a circuit diagram of the alternate bipolar output secondary rectifier circuit.

The schematic of an alternate secondary circuit with two outputs of opposite polarity using a single output winding for both above described aspects of the invention is shown in FIG. 10. The transformer has a secondary winding with two DC blocking capacitors Cs1 and Cs2 and two half wave diode rectifier circuits Ds1, Ds2 and Ds3, Ds4 and output capacitors CL1 and CL2. This allows developing power for two loads which are of opposite polarity to each other. The output voltages will track each other over a range of loads and regulated output voltages.

Figure 11:
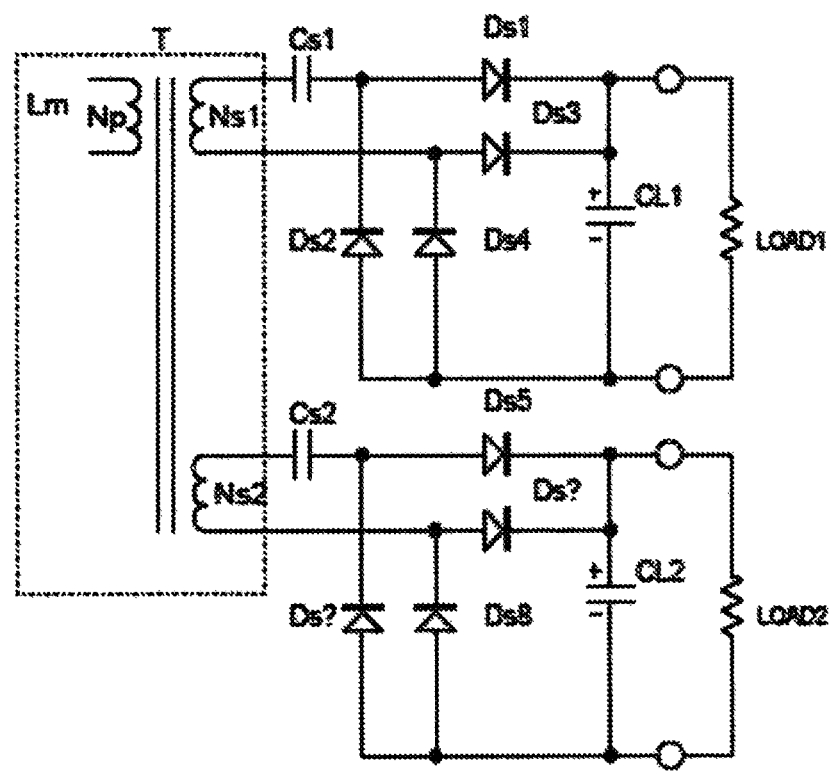
FIG. 11 is a circuit diagram of an alternate configuration with two secondary windings and rectifier circuits.

The schematic of an alternate secondary circuit with two separate outputs for both above described aspects of the invention is shown in FIG. 11. The transformer has two secondary windings Ns1 and Ns2 each with a DC blocking capacitor Cs1 and Cs2 and full wave diode rectifier circuit Ds1, Ds2, Ds3, Ds4 and Ds5, Ds6, Ds7, Ds8 and each has an output capacitor CL1 and CL2. This allows developing power for two loads which could be connected in series or parallel or could be galvanically isolated from each other. The output voltages will be the same if the number of turns of the two secondary's are identical or can be different if the number of turns are different. If the resonant inductor is in series with the primary winding and the leakage inductance between the two secondary windings is low the voltage of the two outputs will track each other over a range of loads and regulated output voltages.

The resonant inductance can instead be connected in series with the secondary windings, be created by the leakage inductance between the primary and secondary windings or be a combination of the leakage inductance and a discrete inductor. Also any configuration of rectifying circuit consisting of diodes and capacitors can be used as long as the circuit blocks the DC voltage from the secondary winding and creates an output voltage that is equal to, or an integral multiple of, the peak-peak voltage of the transformer secondary winding. Also multiple secondary windings or tapped secondary windings and rectification circuits can be employed to create more than one output of the same or different voltages and polarity.

Figure 12:
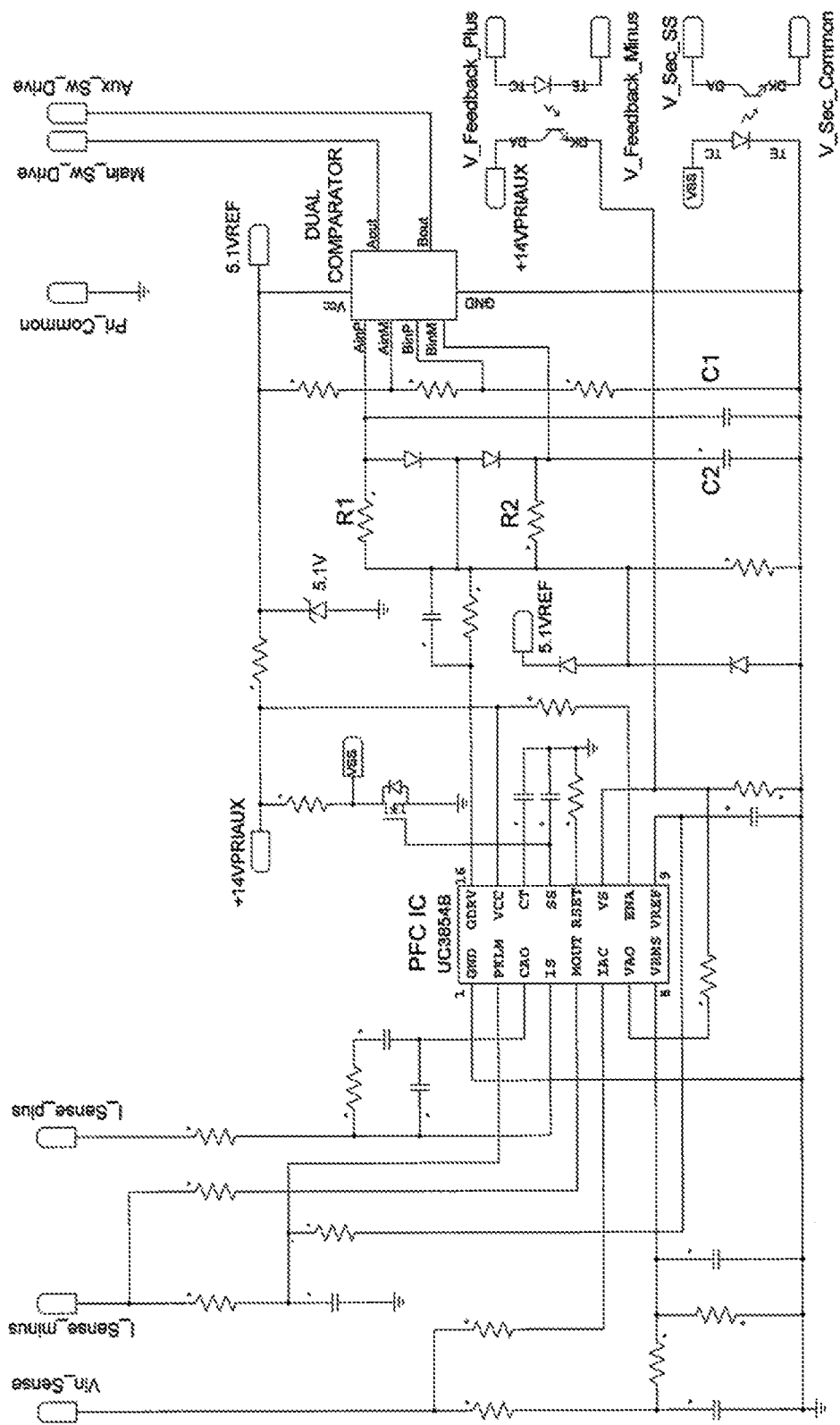
FIG. 12 is a circuit diagram of a practical primary side control circuit to implement the method of control of the converter.

The schematic of a practical primary side control circuit for the invention is shown in FIG. 12. This circuit implements a method of control of the converter which consists of using a commonly available PFC IC such as TI UC3854B and adding circuitry to develop the two drive signals D and 1-D for the main and active clamp switches respectively with a fixed dead time between the drive signals. The signal for turning the main switches on is the same as the gate drive signal of the UC3854B except with a short fixed delay of the turn on created by a RC time constant R1, C1 and part A of a dual comparator IC. The signal for turning the clamp switch(es) on is the opposite to the gate drive signal of the UC3854B except with a short fixed delay of the turn on of the clamp switch(es) created by a second RC time constant R2, C2 and part B of the dual comparator IC.

Figure 13:
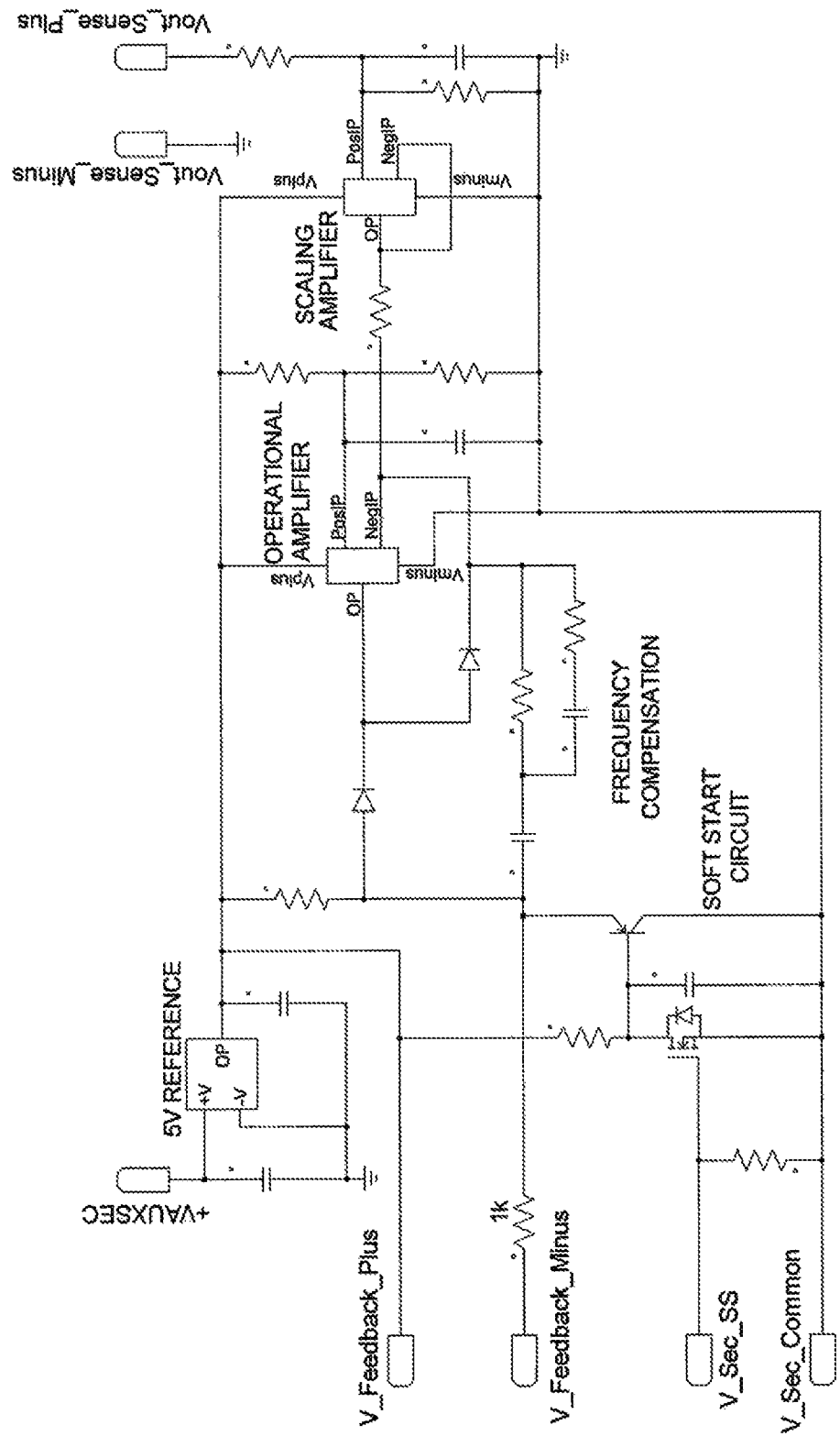
FIG. 13 is a circuit diagram of practical secondary side control circuitry to implement the method of control of the converter.

The schematic of a practical secondary side control circuit for the invention is shown in FIG. 13. An operational amplifier compares a scaled down representation of the output voltage to a reference voltage and creates an error voltage which is transferred to the primary side via an optical coupler. Feedback frequency compensation components assure a slow voltage loop response to minimize the input current distortion while a secondary side soft start circuit minimizes overshoot of the output voltage when the converter is turned on.

Figure 14:
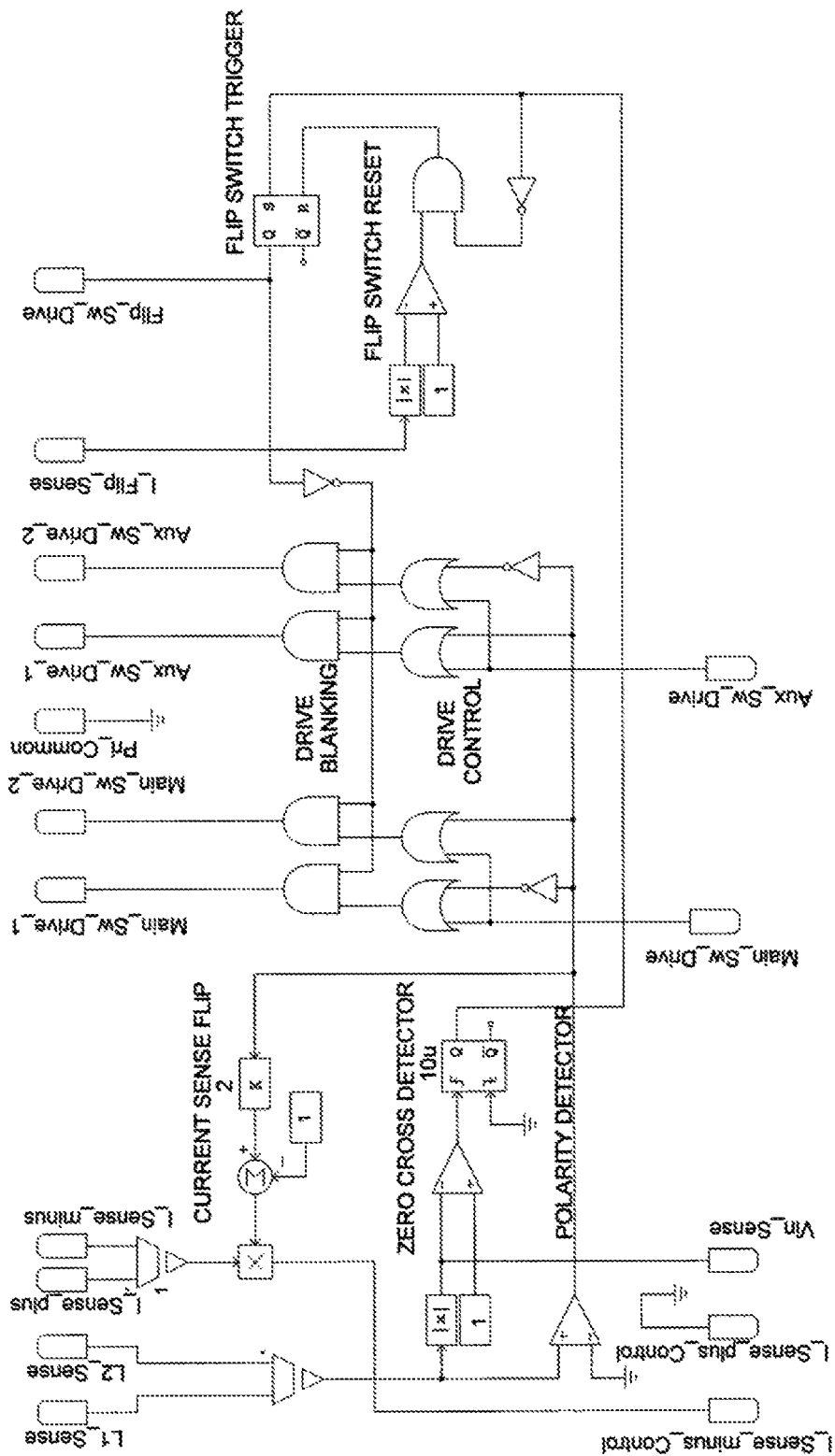
FIG. 14 is a circuit diagram of additional primary side control logic circuitry to implement additional methods of control of the second aspect of the invention.

The schematic of additional primary side logic control circuitry that can be used to optimize control of the second aspect of the invention is shown in FIG. 14. This is an important method which prevents overshoot of the switching voltage due to inexact switch drive timing of this converter and other converters using back to back series connected devices to realize bipolar switches. Simulation has shown that for any bipolar converter simply driving bipolar switches with the same drive signal will not work unless the drive timing is absolutely perfect which it will never be in practice. This circuitry implements an additional method of control of the second aspect of the invention. This method involves creating the D, I-D, D' and (I-D)' drive signals for the main and clamp switches from the above mentioned comparator outputs using drive control logic so that the first main switch and clamp switch are driven to be on or off by the complementary drive waveforms D and 1-D respectively during the positive half cycle of the AC line voltage while the second main switch and clamp switch are driven to be continuously on. Conversely the second main switch and clamp switch are driven to be on or off by complementary drive waveforms D' and (I-D)' respectively during the negative half cycle of the AC line voltage while the first main switch and first clamp switch are driven to be continuously on, according to the detected polarity of the input voltage. The input voltage is sensed and scaled down to control voltage level and a polarity detector determines which polarity the input voltage is. In this case its output is high for positive polarity and low for negative polarity. Main and clamp switch logic circuitry allows pulse width modulation of one of the series connected back-back connected switches while keeping the other continually on for each half line cycle depending upon the detected polarity of the input voltage. A zero cross detector senses the time when the input voltage is close to zero, in this case its output is high during the zero cross time and a mono-stable ensures the zero cross pulse is at least a minimum pulse width, in this case 10 uS.

Also shown in FIG. 14 is logic for driving the flipping switch which unlike the main and clamp switches is a bipolar switch that can be driven by a single drive signal. A flipping switch trigger provides a turn on signal for the flipping switch at the zero cross time. The flipping switch current is sensed and the flipping switch signal then turns off the flipping switch once the flipping switch circuit current approaches zero. Alternately the flipping switch can be turned on for a fixed time as long as the values of the clamp capacitor and flipping inductors are well known. Gate drive blanking logic also turns off the drive signals for all the main and active clamp switches during the time that the flipping switch is conducting.

Figure 15:
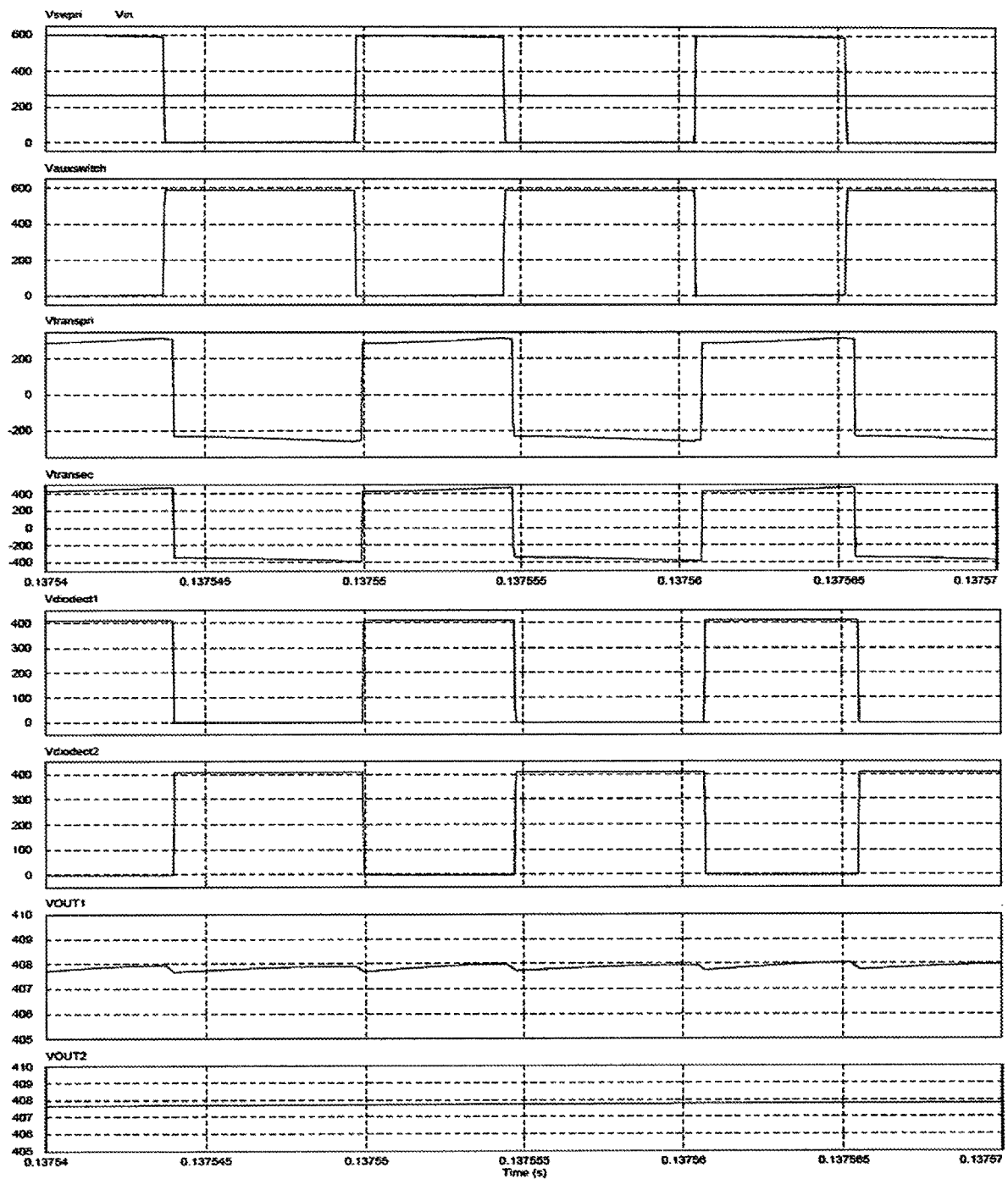
FIG. 15 is voltage waveforms details of the first and second aspects of the invention at nominal line voltage, peak of the input voltage waveform.
Figure 16:
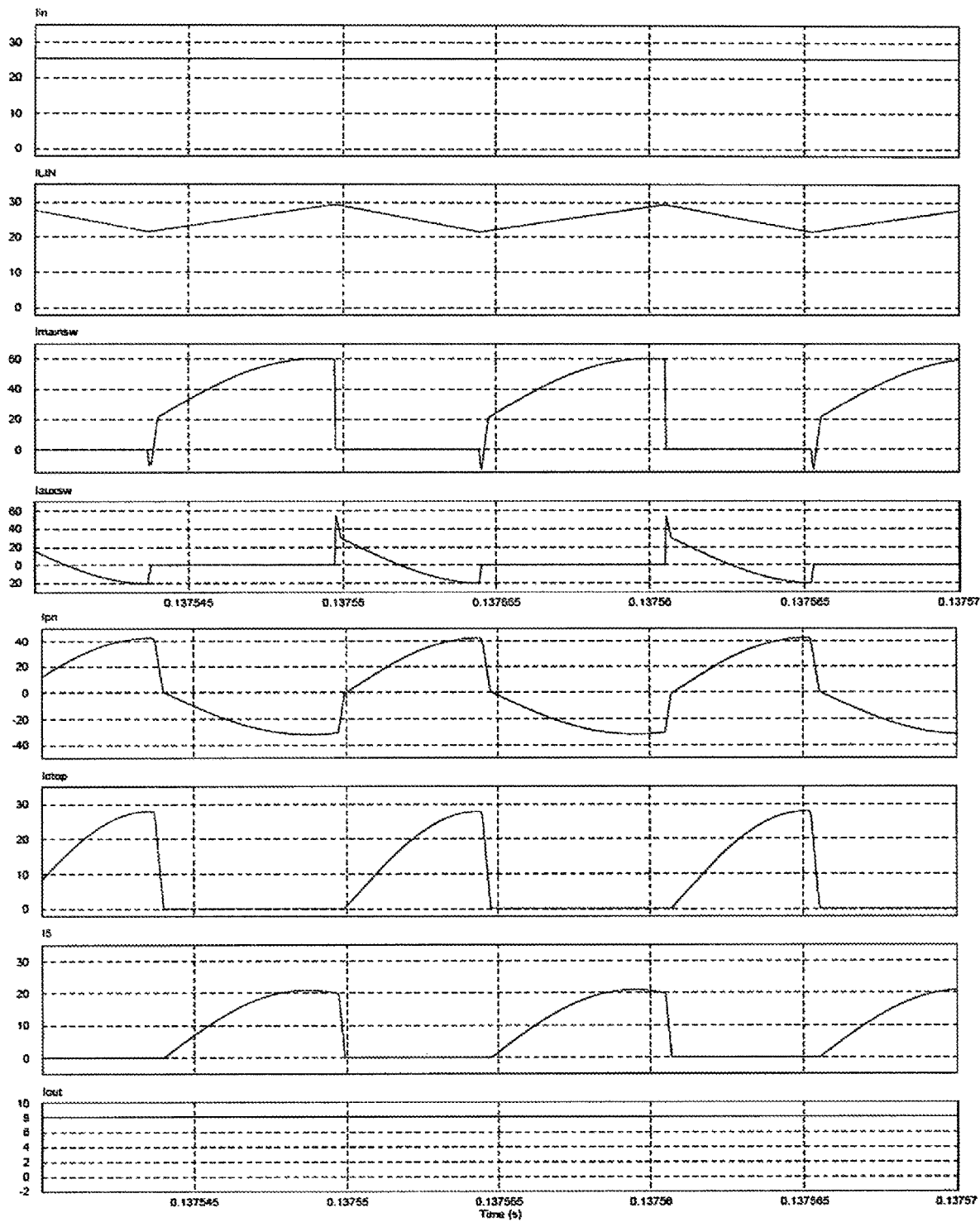
FIG. 16 is current waveforms details of the first and second aspects of the invention at nominal line voltage, peak of the input voltage waveform.

A detail of the circuit waveforms of the first aspect of the invention is shown in FIGS. 15 and 16. The waveforms shown are for the first aspect of the invention for the peak of the AC line voltage. The waveforms of the second aspect of the invention will be the same as shown for the positive peak of the AC line voltage. The top screen of FIG. 15 displays the input voltage which is constant for this duration and the switching voltage across the main switch(es), the second screen shows the switching voltage across the clamp switch(es), the third screen shows the switching voltage across the primary of the transformer, the forth screen shows the switching voltage across the secondary of the transformer, the sixth and seventh screens shows the output diode voltage waveforms, while the last two screens show the output voltage before and after the small output filter. One can see that all the switching voltage waveforms have two states either high or low and that there is controlled dV/dT transition between these two states, there is no ringing or spikes in any of the voltage waveforms which help to improve EMI and conversion efficiency as no lossy snubbers are required. The top screen of FIG. 16 displays the input current which is constant for this duration, the second screen shows the current of the PFC inductor, the third screen shows the current of the clamp switch(es), the fifth screen shows the current waveform through the primary of the transformer (The current through the secondary of the transformer is similar in shape with a little less slope), and sixth and seventh screens shows the output diode current waveforms, while the last screen shows the output current of the converter after the small output filter. It can be seen that the primary side switches are Zero Voltage Switched while the output diodes are turned off with controlled dI/dT. The clamp switch current is much less than the main switch current and the current waveforms are well behaved with no ringing to speak of.

Figure 17:
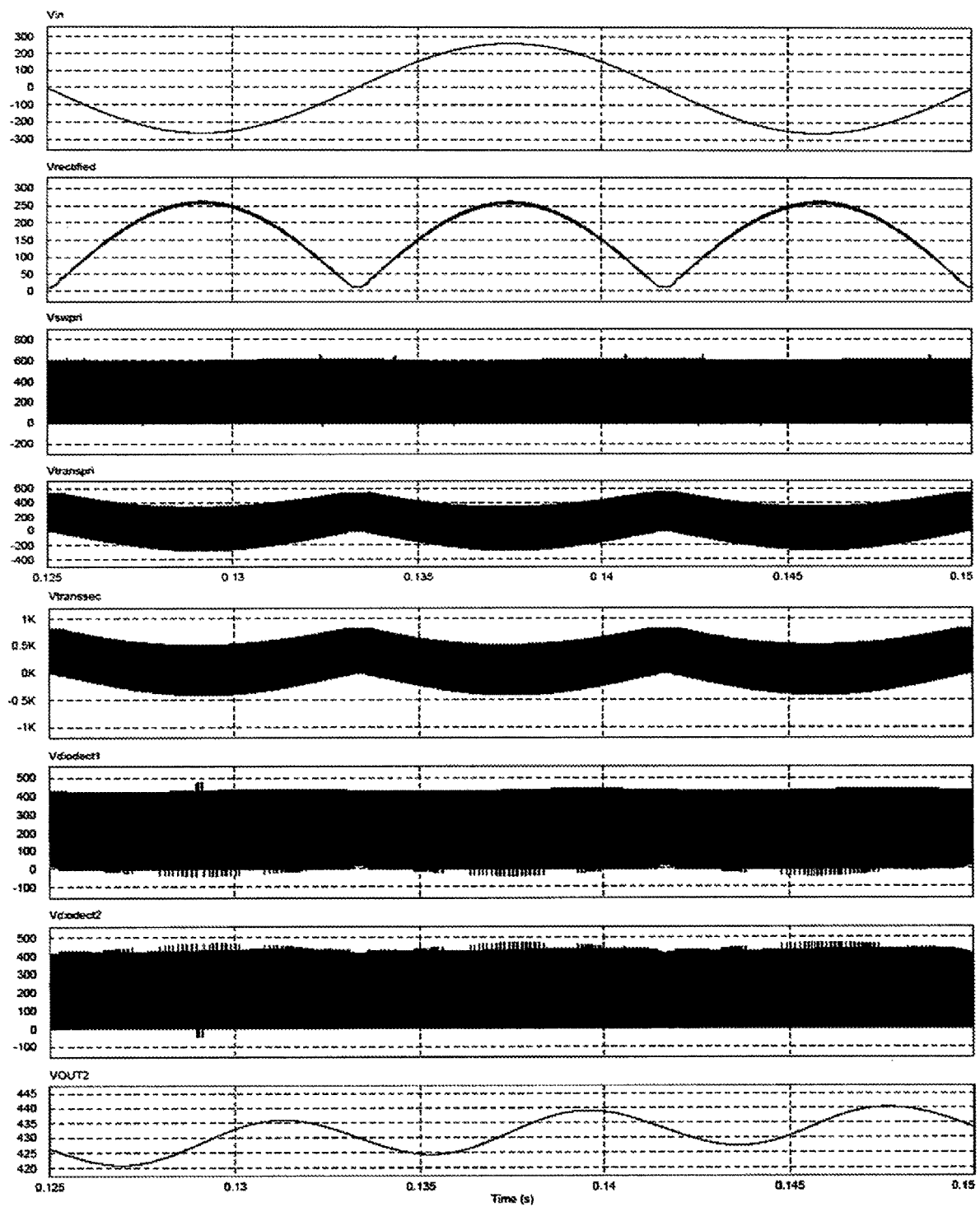
FIG. 17 is circuit voltage waveforms of the first aspect of the invention at nominal line input voltage over one and a half line cycles.
Figure 18:
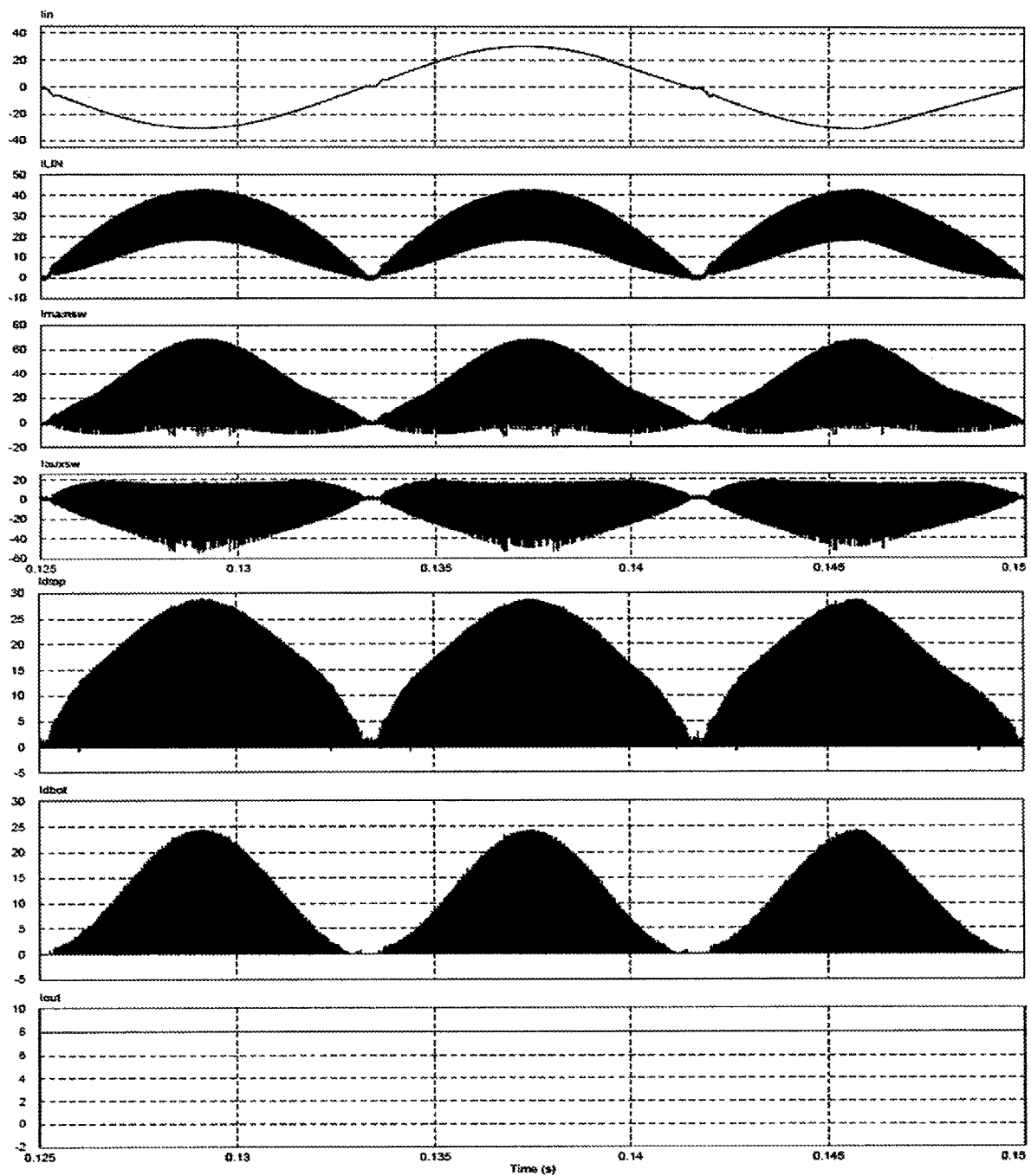
FIG. 18 is circuit current waveforms of the first aspect of the invention at nominal line input voltage over one and a half line cycles.

The voltage waveforms of the first aspect of the invention over several AC line cycles at nominal line voltage is shown in FIG. 17. The top screen displays the input voltage, the second screen shows the rectified input voltage, the third screen shows the switching voltage envelope of the main switch (the switching voltage envelope of the auxiliary switch is identical so is not shown), the forth screen shows the voltage waveform envelope across the primary winding of the transformer, the fifth screen shows the voltage waveform envelope across the secondary winding of the transformer, and sixth and seventh screens shows the output diode waveform voltage envelopes, while the last two screens show the output voltage after the small output filter. The current waveforms for the same conditions are shown in FIG. 18. The top screen displays the input current, the second screen shows the PFC inductor current, the third screen shows the switching current envelope of the main switch, the forth screen shows switching current envelope of the auxiliary switch, the fifth screen and the sixth screens show the current waveform envelope of the output diodes, while the last screen show the output current after the small output filter. Excellent power factor and input current Total Harmonic Distortion (THD) is evident. The input and output switching voltage waveforms have a more or less constant peak value over the line cycles. Zero Voltage Switching is also maintained over the line cycles and for various loads. The peak switching currents however are rather high as the main switch conducts both the input current and the reflected load current and both switches conduct the magnetizing current of the PFC inductor and transformer, however this latter current does not increase the conduction losses substantially. Level 2 Virtual Prototype PSIM simulations with component parasitics included and experimental results demonstrates that 99% power factor, 5% THD, and greater than 95% efficiency is achievable at 3 kW load. This is quite respectable performance. The output voltage contains some twice AC line frequency ripple voltage and the transient response is relatively slow. Also the converter is most suited to higher output voltage applications such as 400V as shown in the previous example. This limits the applications of the converter somewhat however, it is particularly suited to be used as an input PFC and isolation stage for equipment such as programmable AC power sources and high voltage battery chargers.

Figure 19:
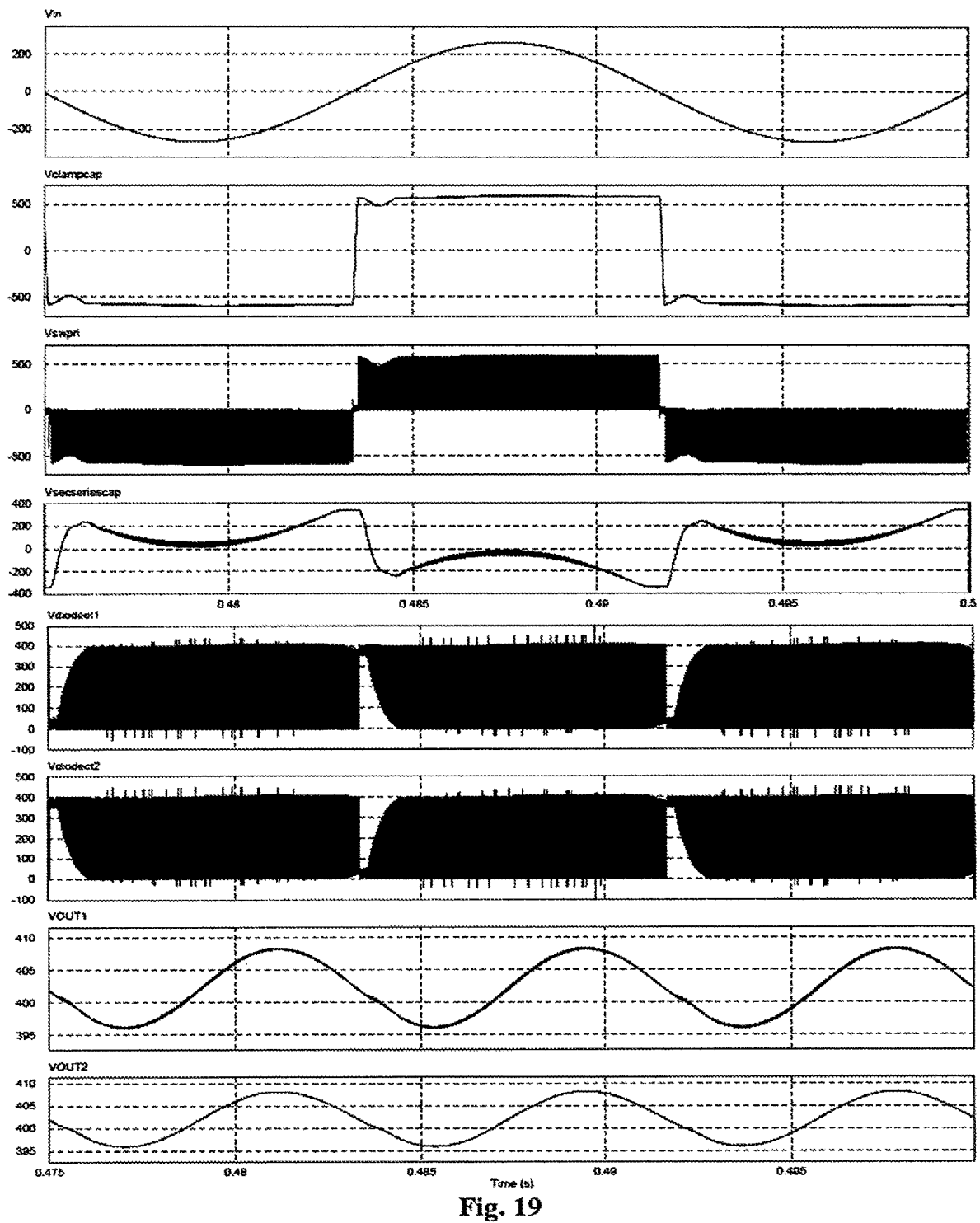
FIG. 19 is circuit voltage waveforms of the second aspect of the invention at nominal line input voltage over one and a half line cycles.
Figure 20:
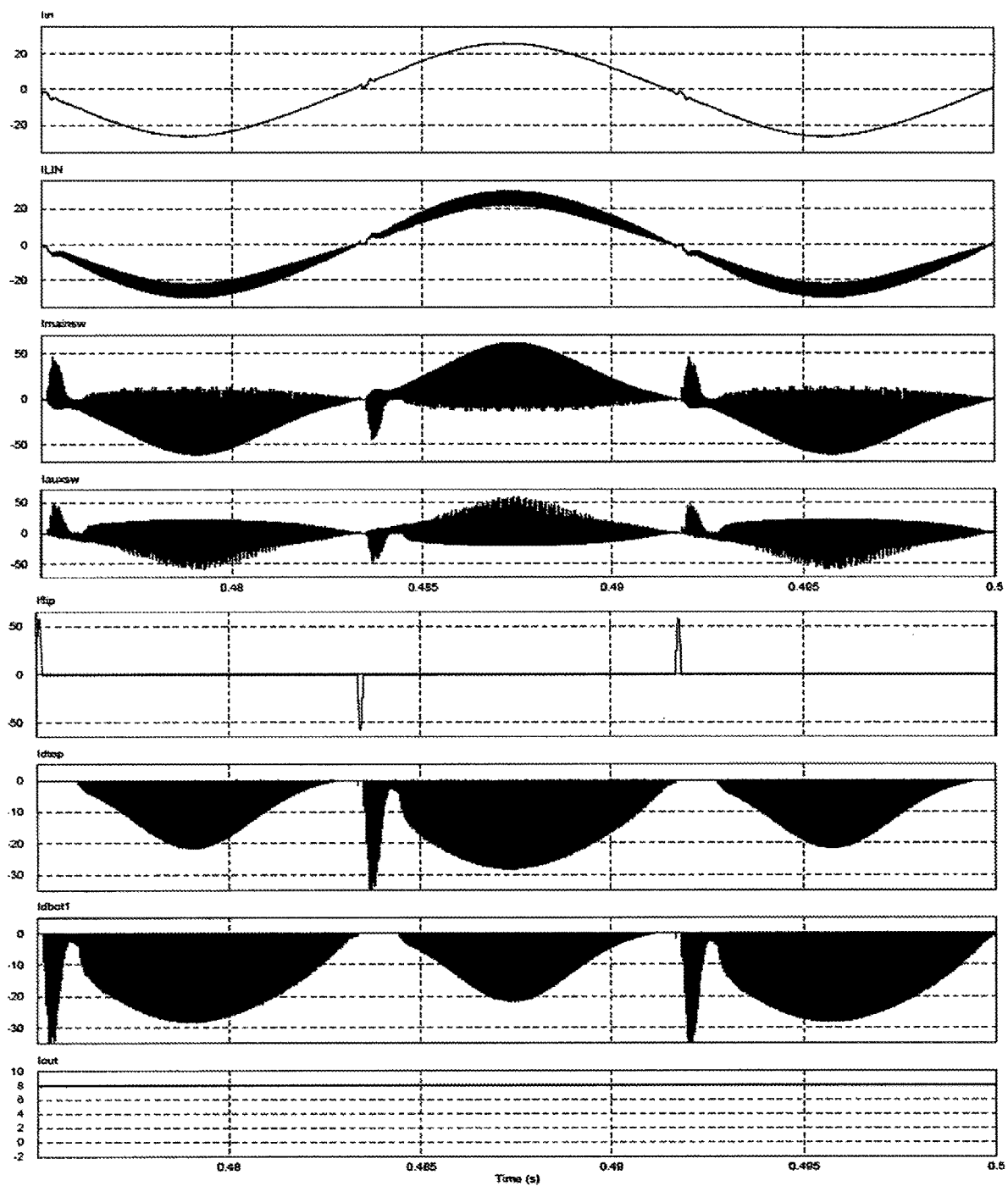
FIG. 20 is circuit current waveforms of the second aspect of the invention at nominal line input voltage over one and a half line cycles.

The voltage waveforms of the second aspect of the invention over a one and a half AC line cycles at nominal line voltage is shown in FIG. 19. The top screen displays the input voltage, the second screen shows the clamp capacitor voltage, the third screen shows the switching voltage envelope of the main switch, the forth screen shows the secondary series capacitor voltage, the fifth and sixth screens shows the output diode waveform voltage envelope, while the last to screens show the output voltage before and after the small output filter. The current waveforms for the same conditions are shown in FIG. 20. The top screen displays the input current, the second screen shows the PFC inductor current, the third screen shows the switching current envelope of the main switch, the forth screen shows switching current envelope of the auxiliary switch, the fifth screen shows the current of the flipping circuit, the sixth and seventh screens show the current waveform envelope of the output diodes, while the last screen show the output current after the small output filter. One can see an interesting dip of the clamp capacitor voltage after it has been flipped and an extra amount of current in the MOSFET switches as a result of them working to flip the voltage on the output DC blocking capacitor. The high frequency switching waveform details are not shown as they are the same for the first aspect of the invention except for the time after zero cross detection. Zero Voltage Switching of all MOSFET switches is maintained over the full line cycle. 99% Power Factor, 3.3% THD, and greater than 96% conversion efficiency has been demonstrated showing that the second aspect of the invention features yet superior performance. This is also better than prior art converters that use an inferior clamp circuit and damping circuit and do not have a clamp capacitor flipping circuit. Indeed simulation of the true bridgeless converter with the clamp capacitor flipping circuit deactivated demonstrated that the converter efficiency reduced by 2% and THD increased indicating it's importance to achieving high converter performance.

It should be mentioned that extra circuitry or components such as capacitors or Resistor-Capacitor snubbers in parallel with the main and clamp switches or output rectifying diodes to limit dV/dT could be added to the invention or that other variations in the details of the embodiments specifically illustrated and described can be made without departing from the true spirit and scope of the invention.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

What is claimed is:

1. A single stage isolated Power Factor Corrected (PFC) converter without an input bridge rectifier, a first terminal of an input inductor being connected to a first terminal of an AC input source, a power transformer with primary and secondary windings, the said primary winding is connected in series with a resonant inductor, whose value is small compared to the input inductor, the series combination of said primary winding and said resonant inductor being connected between a second terminal of the input inductor and a first terminal of a input capacitor, a second terminal of the input capacitor being connected to a second terminal of the AC input source, a damper circuit consisting of a series connection of a resistor and a high frequency blocking inductor being connected between the first terminal of the input capacitor and the first terminal of the AC input source, a main switch consisting of a single bidirectional four state GaN HEMT controlled semiconductor switching device connected between the second terminal of the input inductor and the second terminal of the AC input source, an active clamp circuit consisting of a series connection of a clamp capacitor and a single bidirectional four state GaN HEMT controlled semiconductor switching device being connected in parallel with the main switch.

2. A single stage isolated Power Factor Corrected (PFC) converter as in claim 1, further comprising a flipping circuit consisting of a series combination of a bidirectional switch and an inductor connected in parallel with the clamp capacitor to flip the polarity of the voltage of the clamp capacitor at the zero voltage crossing time of the AC input voltage.

* * * * *